United States Patent
Wu et al.

(10) Patent No.: US 12,238,732 B2
(45) Date of Patent: Feb. 25, 2025

(54) METHOD, USER EQUIPMENT, BASE STATION, DEVICE AND MEDIUM FOR CONTENTION-BASED UPLINK DATA TRANSMISSION

(71) Applicant: Samsung Electronics Co., Ltd., Gyeonggi-do (KR)

(72) Inventors: Min Wu, Beijing (CN); Miao Zhou, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 639 days.

(21) Appl. No.: 17/601,233

(22) PCT Filed: Apr. 2, 2020

(86) PCT No.: PCT/KR2020/004529
§ 371 (c)(1),
(2) Date: Oct. 4, 2021

(87) PCT Pub. No.: WO2020/204637
PCT Pub. Date: Oct. 8, 2020

(65) Prior Publication Data
US 2022/0210816 A1   Jun. 30, 2022

(30) Foreign Application Priority Data

Apr. 4, 2019   (CN) .......................... 201910272803.5

(51) Int. Cl.
*H04W 72/23*   (2023.01)
*H04W 72/02*   (2009.01)
(Continued)

(52) U.S. Cl.
CPC ........... *H04W 72/23* (2023.01); *H04W 72/02* (2013.01); *H04W 72/0446* (2013.01);
(Continued)

(58) Field of Classification Search
CPC . H04W 72/23; H04W 72/02; H04W 72/0446; H04W 72/0453; H04W 72/0466; H04W 72/1273
See application file for complete search history.

(56) References Cited

U.S. PATENT DOCUMENTS

| | | |
|---|---|---|
| 2011/0243080 A1 | 10/2011 | Chen et al. |
| 2013/0107838 A1* | 5/2013 | Li .................... H04W 72/0453 370/329 |

(Continued)

OTHER PUBLICATIONS

PCT/ISA/210 Search Report issued on PCT/KR2020/004529, Jul. 9, 2020, pp. 3.

(Continued)

*Primary Examiner* — Ricky Q Ngo
*Assistant Examiner* — David M Kayal
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present application provide a method, a UE, a base station, a device, and a computer-readable storage medium for contention-based uplink data transmission. A method for contention-based uplink data transmission comprises: receiving high layer configuration information for a contention-based physical uplink shared channel (PUSCH) transmission; monitoring first downlink control information (DCI) scrambled with a first radio (Continued)

network temporary identity (RNTI) in a first physical downlink control channel search space based on the high layer configuration information, and determining a contention-based PUSCH resource based on the detected first DCI; and transmitting data on the contention-based PUSCH resource. The present application improves the data transmission efficiency and reduces the UE's power consumption.

13 Claims, 5 Drawing Sheets

(51) Int. Cl.
    *H04W 72/044*     (2023.01)
    *H04W 72/0446*     (2023.01)
    *H04W 72/0453*     (2023.01)
    *H04W 72/1273*     (2023.01)

(52) U.S. Cl.
    CPC ... *H04W 72/0453* (2013.01); *H04W 72/0466* (2013.01); *H04W 72/1273* (2013.01)

(56) References Cited

U.S. PATENT DOCUMENTS

2017/0013610 A1\*   1/2017   Lee ........................ H04W 72/21
2018/0115988 A1\*   4/2018   Lee ................... H04W 28/0278
2020/0267772 A1\*   8/2020   Jung ................... H04W 74/004

OTHER PUBLICATIONS

PCT/ISA/237 Written Opinion issued on PCT/KR2020/004529, Jul. 9, 2020, pp. 6.

Samsung, "Discussion on transmission in preconfigured UL resources for MTC", R1-1904375, 3GPP TSG RAN WG1 Meeting #96bis, Xi'an, China, Mar. 29, 2019, pp. 7.

Huawei et al., "UL transmission in preconfigured resource", R1-1903918, 3GPP TSG RAN WG1 Meeting #96bis, Xi'an, China, Mar. 30, 2019, pp. 9.

\* cited by examiner

[Fig. 1a]
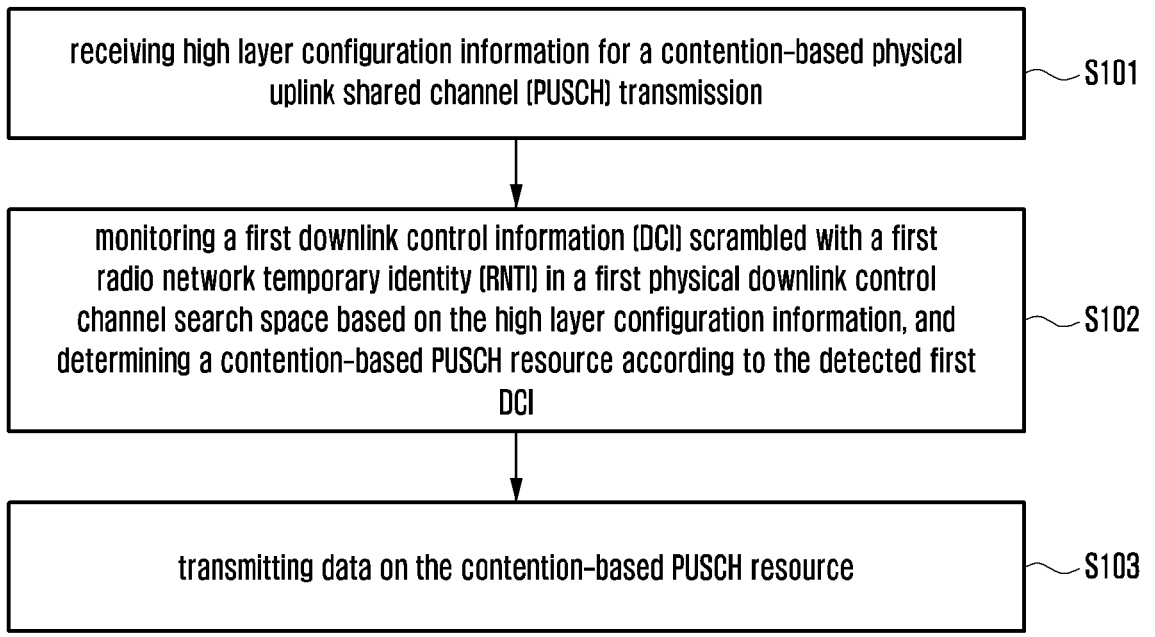
[Fig. 1b]
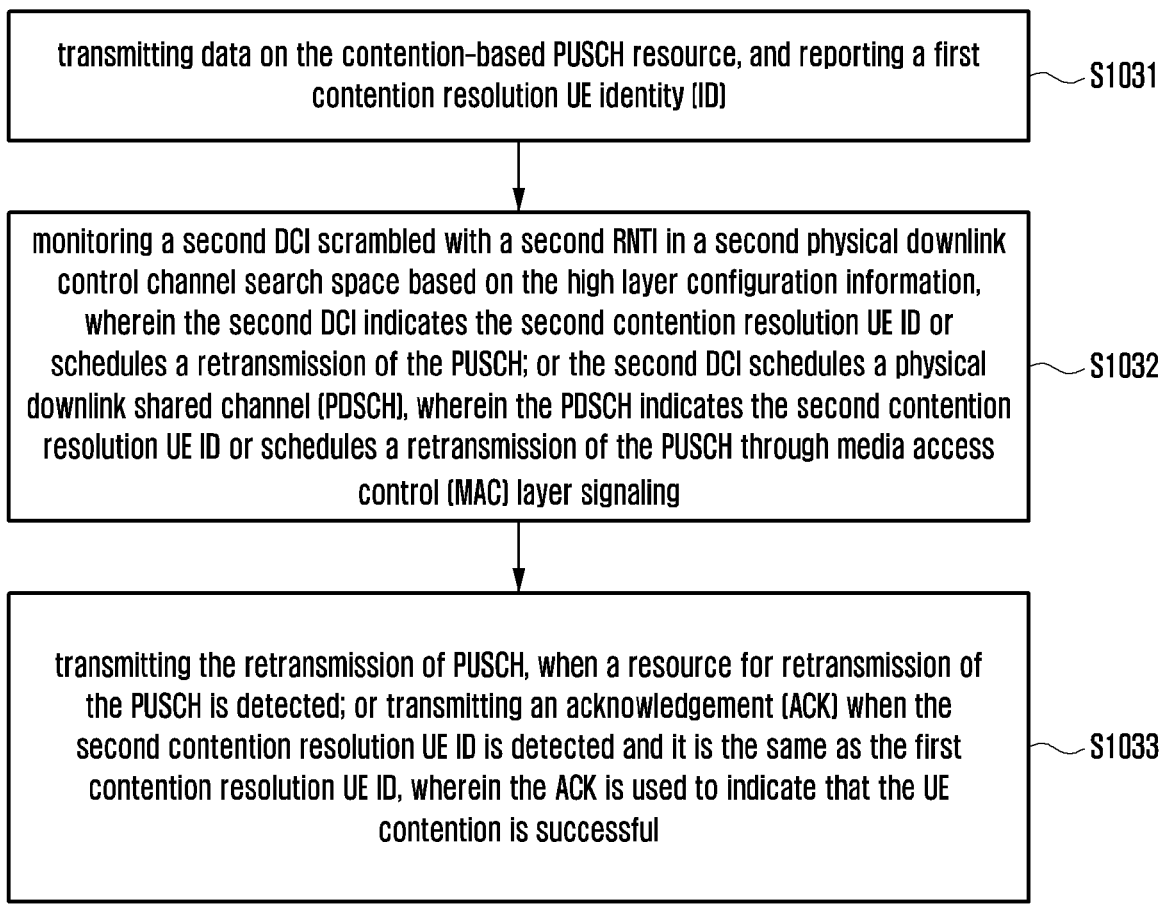

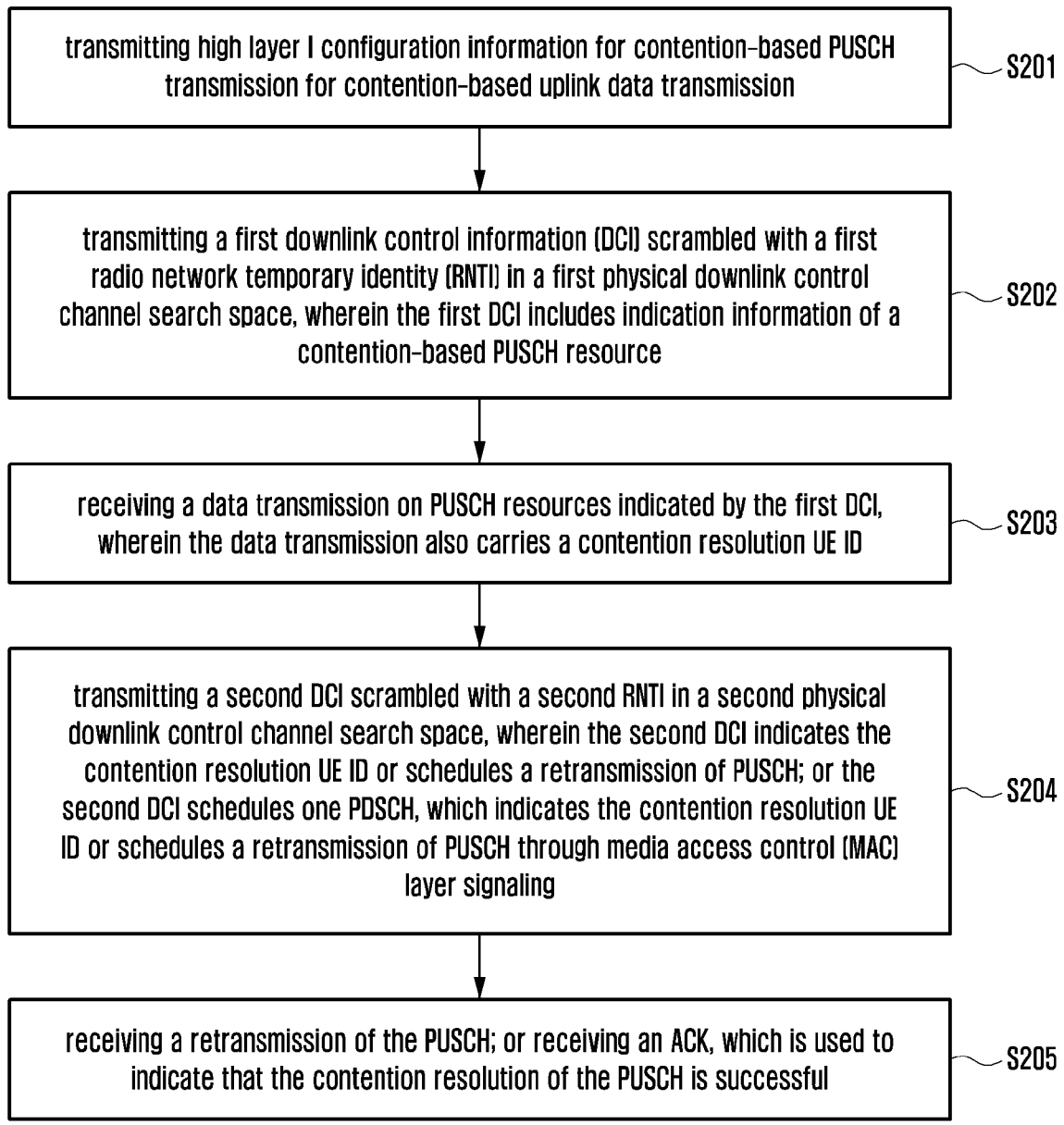
[Fig. 2]

[Fig. 3]
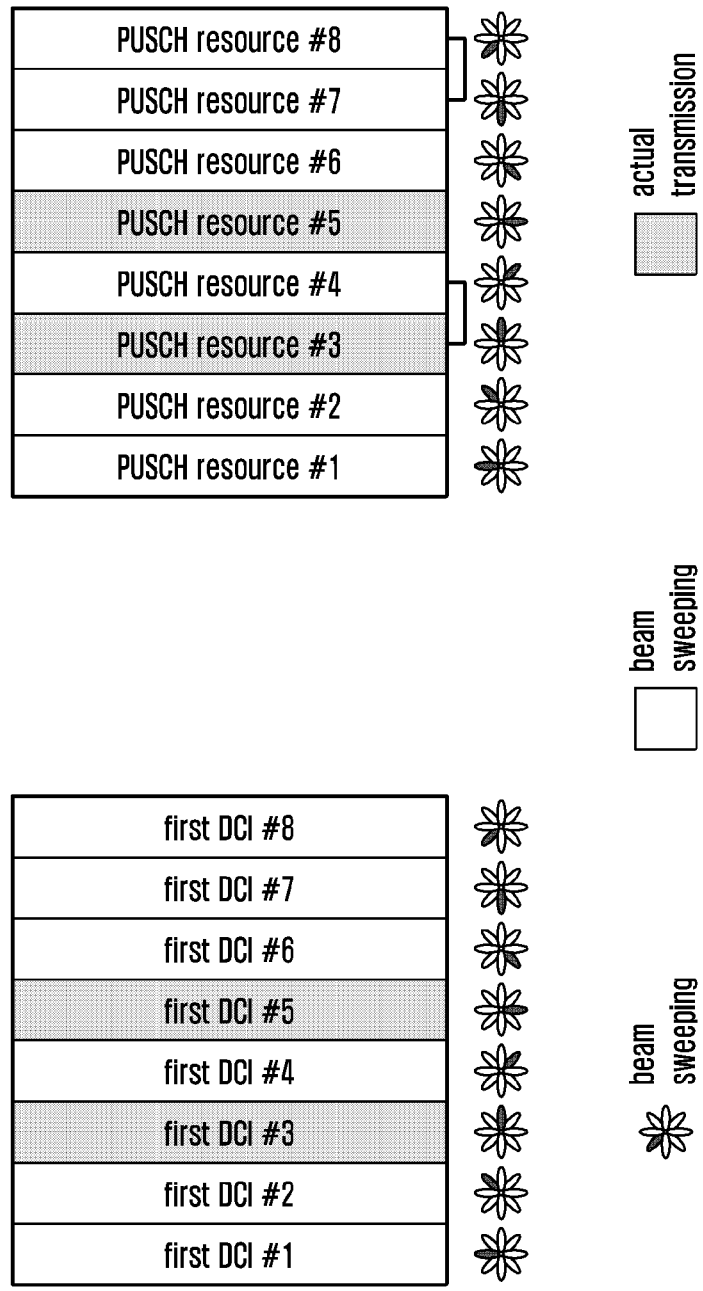

[Fig. 4]
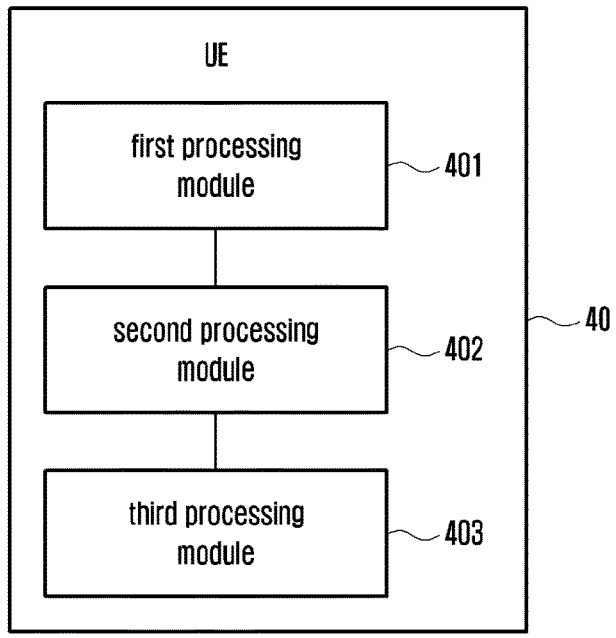
[Fig. 5]
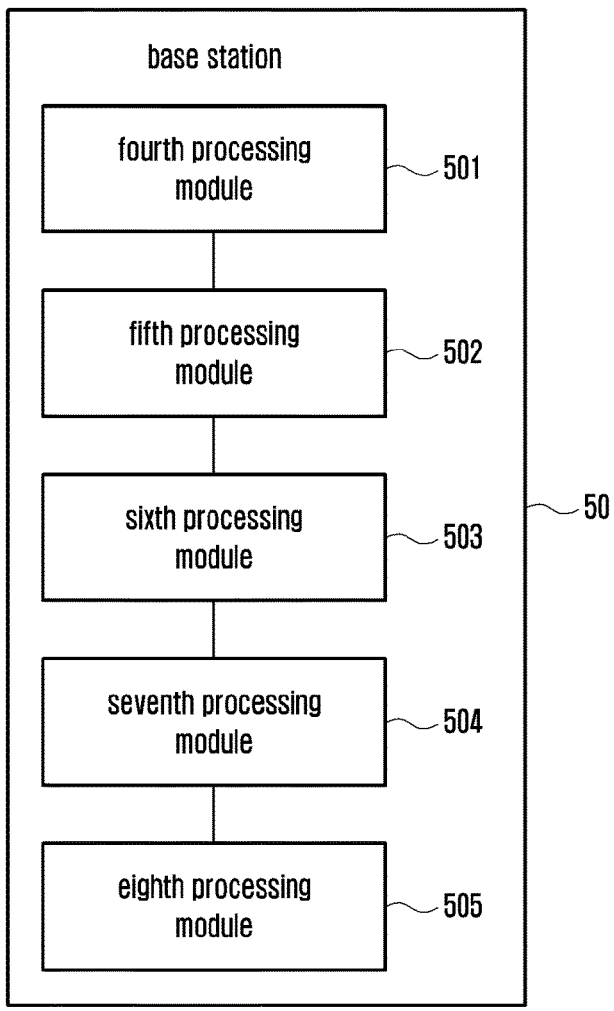

[Fig. 6]
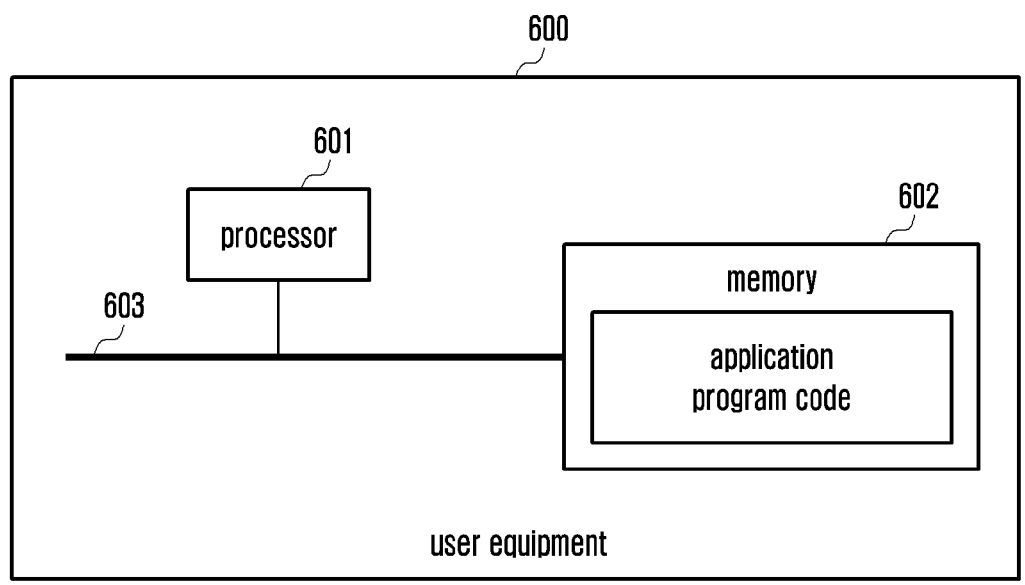
[Fig. 7]
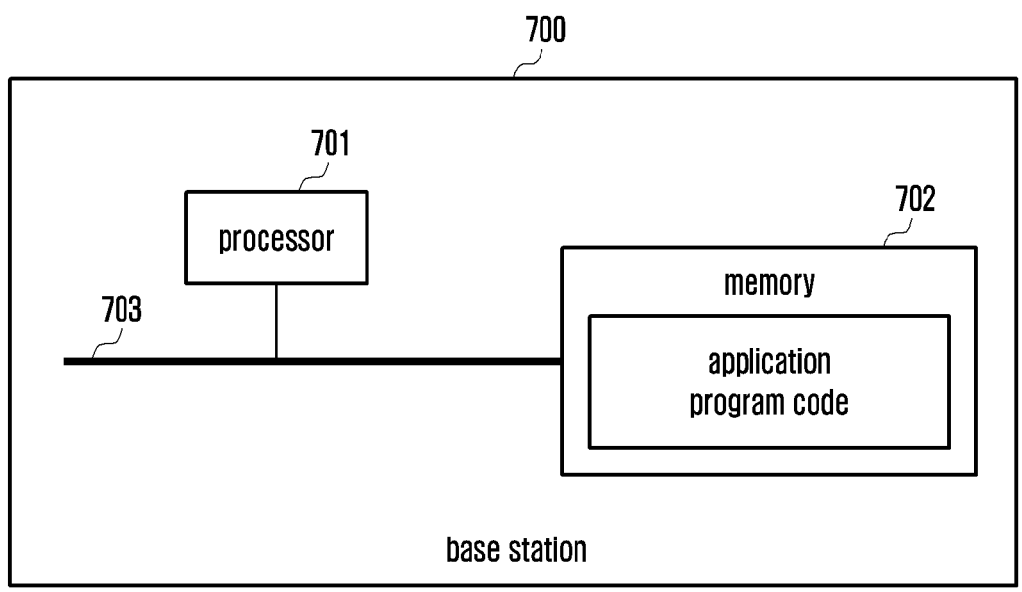

METHOD, USER EQUIPMENT, BASE STATION, DEVICE AND MEDIUM FOR CONTENTION-BASED UPLINK DATA TRANSMISSION

PRIORITY

This application is a National Phase Entry of PCT International Application No. PCT/KR2020/004529, which was filed on Apr. 2, 2020, and claims priority to Chinese Patent Application No. 201910272803.5, which was filed on Apr. 4, 2019, the content of each of which is incorporated herein by reference.

TECHNICAL FIELD

The present application relates to the field of wireless communication technologies, and in particular, the present application relates to a method, a UE, a base station, a device and a computer readable medium for contention-based uplink data transmission.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

For a UE in Internet-Of-Things (IoTs) such as Machine Type Communications (MTCs) and Narrow Band Internet of Things (NB-IoTs), since the limitations of application scenarios, that is, it is often placed underwater or in places, for example, a basement, where it is not convenient to charge or replace the battery, it has a higher requirement for working life of battery. For some special UEs, they even require a battery's working life to up to 10 years. Therefore, UE's power consumption has always been the focused indicator to be improved of IOT UE and related standards are constantly evolved based on the goal of reducing UE's power consumption.

In the LTE Rel-16 efeMTC and NB-IOT systems, one of the research topics under discussion is to support a pre-configured uplink transmission in RRC idle mode, that is, to transmit data on pre-configured uplink resource (PURs) to save the signaling overhead for establishing an RRC connection and the dynamic scheduling signaling for each PUSCH transmission, which also avoids extra UE's power consumption in the RRC connection state, thereby improving system transmission efficiency and reducing UE's power consumption. In the pre-configured uplink transmissions under discussion in 3GPP, the pre-configured uplink resource may be dedicated to one UE, that is, the contention-free PUSCH transmission, or may be shared by a group of UEs, that is, the contention-based PUSCH transmission. The PUSCH resource used for data transmission are pre-configured by the RRC signaling, such as broadcasted by cell system information, or configured by a UE-specific RRC signaling. If the base station pre-configures periodic uplink resource for a UE or a group of UEs, the system needs to reserve these resource regularly, which has a certain impact on the usage efficiency of system resource. There is still space for optimization for the PUSCH resource indication manner in pre-configured uplink transmission.

Solution to Problem

In the first aspect, a method for contention-based uplink data transmission, applied to a user equipment (UE), is provided, which comprises:

receiving high layer configuration information for a contention-based physical uplink shared channel (PUSCH) transmission;

monitoring first downlink control information (DCI) scrambled with a first radio network temporary identity (RNTI) in a first physical downlink control channel search space based on the high layer configuration information, and determining a contention-based PUSCH resource according to the detected first DCI; and transmitting data on the contention-based PUSCH resource.

In a second aspect, a method for contention-based uplink data transmission, applied to a base station, is provided, which comprises:

transmitting high layer configuration information for contention-based PUSCH transmission for contention-based uplink data transmission;

transmitting a first downlink control information (DCI) scrambled with a first radio network temporary identity (RNTI) in a first physical downlink control channel search space, wherein the first DCI includes indication information of a contention-based PUSCH resource;

receiving a PUSCH transmission on an uplink contention-based resource indicated by the first DCI, wherein the PUSCH transmission also carries a contention resolution UE ID;

transmitting a second DCI scrambled with a second RNTI in a second physical downlink control channel search space, wherein the second DCI indicates the contention resolution UE ID or schedules a retransmission of PUSCH; or the second DCI schedules one PDSCH, which indicates the contention resolution UE ID or schedules a retransmission of PUSCH through media access control (MAC) layer signaling; and receiving a retransmission of the PUSCH; or receiving an ACK, which is used to indicate that the contention resolution of the PUSCH is successful.

In a third aspect, a user equipment (UE) is provided, which comprises:

a first processing module, configured to receive high layer configuration information for a contention-based physical uplink shared channel (PUSCH) transmission;

a second processing module, configured to monitor first downlink control information (DCI) scrambled with a first radio network temporary identity (RNTI) in a first physical downlink control channel search space based on the high layer configuration information, and determining a contention-based PUSCH resource according to the detected first DCI; and a third processing module, configured to transmit data on the contention-based PUSCH resource.

In a fourth aspect, a base station is provided, which comprises:

a fourth processing module, configured to transmit high layer configuration information for contention-based PUSCH transmission for contention-based uplink data transmission;

a fifth processing module, configured to transmit a first downlink control information (DCI) scrambled with a first radio network temporary identity (RNTI) in a first physical downlink control channel search space, wherein the first DCI includes indication information of a contention-based PUSCH resource;

a sixth processing module, configured to receive a data transmission on PUSCH resource indicated by the DCI, wherein the data transmission also carries a contention resolution UE ID;

a seventh processing module, configured to transmit a second DCI scrambled with a second RNTI, wherein the second DCI indicates the contention resolution UE ID or schedules a retransmission of PUSCH; or the second DCI schedules one PDSCH, which indicates the contention resolution UE ID or schedules a retransmission of PUSCH through media access control (MAC) layer signaling; and an eighth processing module, configured to receive a retransmission of the PUSCH; or receive an ACK, which is used to indicate that the contention resolution of the PUSCH is successful.

In a fifth aspect, a user equipment (UE) is provided, which comprises: a processor; and a memory, configured to store machine readable instructions that, when executed by the processor, cause the processor to perform the method for contention-based uplink data transmission in the first aspect.

In a sixth aspect, a base station device is provided, which comprises: a processor; and a memory, configured to store machine readable instructions that, when executed by the processor, cause the processor to perform the method for contention-based uplink data transmission in the second aspect.

In a seventh aspect, a computer readable storage medium is provided, which stores a computer program that is used to perform the method for contention-based uplink data transmission in the first and second aspect.

The technical solutions provided in the embodiments of the present application have at least the following beneficial effects:

The optimization of the PUSCH resource indication manner for the pre-configured uplink transmission is realized, which improves the data transmission efficiency and reduces the UE's power consumption.

Additional aspects and advantages of the present application will be partially appreciated and become apparent from the description below, or will be well learned from the practices of the present application.

Advantageous Effects of Invention

In view of the shortcomings of the existing methods, the present application proposes a method, a UE, a base station, a device, and a computer readable medium for contention-based uplink data transmission, to solve the problem of how to optimize the PUSCH resource indication manner in pre-configured uplink transmission, thereby improving data transmission efficiency and reducing UE's power consumption.

BRIEF DESCRIPTION OF DRAWINGS

In order to more clearly illustrate the technical solutions in the embodiments of the present application, the drawings used in the description of the embodiments of the present application will be briefly described below.

FIG. 1a is a schematic flowchart of a method for contention-based uplink data transmission according to an embodiment of the present application;

FIG. 1b is a schematic flowchart of data transmission on a contention-based PUSCH resource according to an embodiment of the present application;

FIG. 2 is a schematic flowchart of another method for contention-based uplink data transmission according to an embodiment of the present application;

FIG. 3 is a schematic diagram of applying contention-based PUSCH transmission to frequency range 2 (FR2) according to an embodiment of the present application;

FIG. 4 is a schematic structural diagram of a UE according to an embodiment of the present application;

FIG. 5 is a schematic structural diagram of a base station according to an embodiment of the present application;

FIG. 6 is a schematic structural diagram of a user equipment according to an embodiment of the present application; and FIG. 7 is a schematic structural diagram of a base station according to an embodiment of the present application.

MODE FOR THE INVENTION

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed units or combinations thereof.

All the embodiments related to contention-based PUSCH transmission proposed in this application may be applied to the LTE MTC and LTE NB-IOT systems, and may also be appropriately extended and applied to the 5G New Radio (NR) system. 5G concepts such as beam and carrier Bandwidth Part (BWP) may be used in all the embodiments.

Embodiment 1

An embodiment of the application provides a method for contention-based uplink data transmission, which is applied to a UE. A schematic flowchart of the method is as shown in FIG. 1*a*, and the method includes:

Step S101: receiving high layer configuration information for a contention-based physical uplink shared channel (PUSCH) transmission;

Step S102: monitoring a first downlink control information (DCI) scrambled with a first radio network temporary identity (RNTI) in a first physical downlink control channel search space based on the high layer configuration information, and determining a contention-based PUSCH resource according to the detected first DCI; and Step S103: transmitting data on the contention-based PUSCH resource.

In the embodiment of the present application, the UE receives the high layer configuration information for the contention-based PUSCH transmission; the UE monitors first DCI scrambled with a first RNTI in a first physical downlink control channel search space based on the high layer configuration information; determining a contention-based PUSCH resource according to the detected first DCI; and the UE transmits data on the contention-based PUSCH resource. In this way, it is possible to optimize the PUSCH resource indication manner for the pre-configured uplink transmission, improve data transmission efficiency, and reduce UE's power consumption.

Optionally, an embodiment of the present application provides a schematic flowchart of a process for transmitting data on a contention-based PUSCH resource, and the schematic flowchart is as shown in FIG. 1*b*, including:

Step S1031: transmitting data on the contention-based PUSCH resource, and reporting a first contention resolution UE identity (ID);

Step S1032: monitoring a second DCI scrambled with a second RNTI in a second physical downlink control channel search space based on the high layer configuration information, wherein the second DCI indicates the second contention resolution UE ID or schedules a retransmission of the PUSCH; or the second DCI schedules a physical downlink shared channel (PDSCH), wherein the PDSCH indicates the second contention resolution UE ID or schedules a retransmission of the PUSCH through media access control (MAC) layer signaling; and Step S1033: transmitting the retransmission of PUSCH, when a resource for retransmission of the PUSCH is detected; or transmitting an acknowledgement (ACK) when the second contention resolution UE ID is detected and it is the same as the first contention resolution UE ID, wherein the ACK is used to indicate that the UE contention is successful.

Optionally, the high layer configuration information comprises at least one of the followings:

the first physical downlink control channel search space for transmitting the first DCI, the second physical downlink control channel search space for transmitting the second DCI, the first RNTI for transmitting the first DCI, the second RNTI for transmitting the second DCI, a first control resource set (CORESET) for transmitting the first DCI, a second CORESET for transmitting the second DCI, power control parameters of the PUSCH, demodulation reference signal (DMRS) parameters of the PUSCH, a contention resolution window the PUSCH, maximum times of retransmission of PUSCH, a transmission block size (TBS) or a maximum TBS of PUSCH, a first downlink bandwidth part (DL BWP) for transmitting the first DCI, and a second DL BWP for transmitting the second DCI, and the uplink bandwidth part (UL BWP) where the PUSCH is located.

Optionally, the first RNTI and the second RNTI are the same RNTI, the first DCI and the second DCI use the same DCI format, or use the same DCI payload size, wherein the first DCI and the second DCI include a Flag field, which is used to determine whether the DCI is used for PUSCH resource scheduling or PUSCH contention response.

Optionally, the first DCI indicates that a group of PUSCH resources use different time-frequency resource blocks, and the UE randomly selects one from a plurality of time-frequency resource blocks for data transmission;

the first DCI indicates that a group of PUSCH resources use the same time-frequency resource block and different orthogonal coverage codes (OCCs), and the UE randomly selects one from a plurality of OCCs for data transmission;

the first DCI indicates that a group of PUSCH resources use the same time-frequency resource block and different orthogonal spreading codes, and the UE randomly selects one from a plurality of orthogonal spreading codes for data transmission;

the first DCI indicates that a group of PUSCH resources use the same time-frequency resource block and different DMRSs, and the UE randomly selects one from a plurality of DMRSs for data transmission; and the first DCI indicates that a group of PUSCH resources use the same time-frequency resource block and use different non-orthogonal codewords and the UE randomly selects one from a plurality of non-orthogonal codewords for data transmission.

Optionally, the contention-based PUSCH resource are shared by all or a group of UEs supporting contention-based PUSCH transmission, wherein the contention-based PUSCH resource are shared by all or a group of UEs supporting contention-based PUSCH transmission including at least one of the followings:
  the contention-based PUSCH resource dynamically scheduled by a base station are shared by all radio resource control (RRC) connected mode UEs supporting contention-based PUSCH transmission, or shared by a group of RRC connected mode UEs supporting contention-based PUSCH transmission;
  the contention-based PUSCH resource dynamically scheduled by the base station are shared by all RRC idle mode UEs supporting contention-based PUSCH transmission, or shared by a group of RRC idle mode UEs supporting contention-based PUSCH transmission;
  the contention-based PUSCH resource dynamically scheduled by the base station are shared by all RRC inactive mode UEs supporting contention-based PUSCH transmission, or shared by a group of RRC inactive mode UEs supporting contention-based PUSCH transmission;
  the contention-based PUSCH resource dynamically scheduled by the base station are shared by all RRC non-connected mode UEs supporting contention-based PUSCH transmission, or shared by a group of RRC non-connected mode UEs supporting contention-based PUSCH transmission, wherein the RRC non-connected mode UEs include a RRC idle mode UE and a RRC inactive mode UE;
  the contention-based PUSCH resource dynamically scheduled by the base station are shared by all the UEs in the cell supporting contention-based PUSCH transmission, or shared by a group of the UEs in the cell supporting contention-based PUSCH transmission, wherein the UE includes the RRC connected mode UE and the RRC idle mode UE and RRC inactive mode UE;
  the contention-based PUSCH resource dynamically scheduled by the base station are shared by all discontinuous reception (DRX) mode UEs supporting contention-based PUSCH transmission, or shared by a group of DRX mode UEs supporting contention-based PUSCH transmission, wherein the DRX mode UEs include a RRC idle mode UE and RRC inactive mode UE which are configured with the DRX mode;
  the contention-based PUSCH resource dynamically scheduled by the base station are shared by all extended discontinuous reception (eDRX) mode UEs supporting contention-based PUSCH transmission, or are shared by a group of eDRX mode UEs supporting contention-based PUSCH transmission, wherein the eDRX mode UEs include a RRC idle mode UE and RRC inactive mode UE which are configured to be in the eDRX mode.

Optionally, UE determines that the contention-based PUSCH transmission is used when TA is valid according to a Timing Advance (TA) determination criterion, if the UE is in an RRC idle mode or an RRC inactive mode.

Optionally, the TA determination criteria include at least one of the followings:
  determining whether the TA is valid according to whether the TA in the RRC idle mode or the RRC inactive mode expires, wherein the TA is invalid if the TA expires and the TA is valid if the TA is still running;
  determining whether the TA is valid according to whether the serving cell has changed, wherein the TA is invalid if the serving cell has changed and the TA is valid if the serving cell has not changed;
  determining whether the TA is valid according to the change of the reference signal reception power (RSRP) of the serving cell, wherein the TA is invalid if the change of the RSRP of the serving cell exceeds a predefined or pre-configured threshold, otherwise, the TA is valid;
  determining whether the TA is valid according to the change of the RSRP of one or more neighboring cells, wherein the TA is invalid if the change of the RSRP of one or more neighboring cells exceeds a predefined or pre-configured threshold, otherwise, the TA is valid;
  determining whether the TA is valid according to the change in a time difference of arrival (TDOA) of at least two base stations' signals, wherein the TA is invalid if the change in TDOA exceeds a predefined or pre-configured threshold, otherwise, the TA is valid;
  determining whether the TA is valid according to a UE's static label, wherein the TA is valid if the UE has a label indicating static characteristics, otherwise, the TA is invalid; and
  determining whether the TA is valid according to a radius of the serving cell, wherein the TA is valid if cell system information indicates that the radius of the cell is less than a predefined or pre-configured threshold, otherwise, the TA is invalid.

Optionally, when the UE is in the RRC idle mode or the RRC inactive mode, according to a fallback condition, the UE falling back to use at least one of the following ways to transmit data: transmitting data through a contention-based random access process, transmitting data through an advanced data transmission process, and transmitting data on pre-configured uplink resource; and when the UE is in the RRC connected mode, according to the fallback condition, the UE falling back to use at least one of the following ways to transmit data: transmitting data through a contention-based random access process, transmitting data through a contention-based random access process to request uplink resource, transmitting data through an uplink scheduling request (SR) to request uplink resource and transmitting data on pre-configured uplink resource.

Optionally, the fallback conditions include at least one of the followings:
  the amount of uplink data arrived at the UE side exceeds the TBS value of the PUSCH, or the amount of data arrived exceeds the maximum TBS value of the PUSCH;
  the UE is failed after performing one or more consecutive PUSCH transmissions;
  the second DCI indicates the fallback of UE;
  the UE is in the RRC idle mode or the RRC inactive mode, and the UE has no available TA; and
  the UE does not monitor the contention-based PUSCH resource within a predefined or pre-configured time.

Optionally, the configuration information of multiple TBS values of the contention-based PUSCH is received, wherein the PUSCH transmission corresponding to the largest TBS value among the multiple TBS values uses all symbols or time slots allocated in time domain, and PUSCH transmissions corresponding to the other TBS values among the multiple TBS values use a part of symbols or time slots allocated in the time domain, and transmission starts from the first symbol or time slot in the time domain.

UE selects a TBS value that causes the MAC layer to add the least number of bits to transmit the contention-based PUSCH according to the amount of data arrived.

Optionally, the transmitting of the contention-based PUSCH includes at least one of the followings:

transmitting contention-based PUSCH in a repeated manner on multiple symbols or time slots allocated in the time domain; and transmitting contention-based PUSCH in a rate-matched manner on multiple symbols or time slots allocated in the time domain.

Another method for contention-based uplink data transmission is provided in the embodiment of the present application, which is applied to the base station, and the schematic flowchart of the method is as shown in FIG. 2. The method includes:

Step S201: transmitting high layer configuration information for contention-based PUSCH transmission for contention-based uplink data transmission;

Step S202: transmitting a first downlink control information (DCI) scrambled with a first radio network temporary identity (RNTI) in a first physical downlink control channel search space, wherein the first DCI includes indication information of a contention-based PUSCH resource;

Step S203: receiving a data transmission on PUSCH resource indicated by the first DCI, wherein the data transmission also carries a contention resolution UE ID;

Step S204: transmitting a second DCI scrambled with a second RNTI in a second physical downlink control channel search space, wherein the second DCI indicates the contention resolution UE ID or schedules a retransmission of PUSCH; or the second DCI schedules one PDSCH, which indicates the contention resolution UE ID or schedules a retransmission of PUSCH through media access control (MAC) layer signaling; and Step S205: receiving a retransmission of the PUSCH; or receiving an ACK, which is used to indicate that the contention resolution of the PUSCH is successful.

Optionally, the base station configures multiple TBS values for contention-based PUSCH transmission; and the base station blindly decodes contention-based PUSCH transmission based on the assumption of multiple TBS values.

Optionally, the base station transmits the first DCI on different analog beams in a time division manner, wherein the contention-based PUSCH resource indicated by the first DCI has a one-to-one correspondence with the used analog beam.

Optionally, the base station transmits the first DCI on different analog beams in a time division manner including at least one of the followings:

transmitting the first DCIs on all analog beams, and the first DCIs transmitted on different analog beams include the same indication information for indicating the contention-based PUSCH resource corresponding to all the analog beams; and transmitting the first DCIs on a part of the analog beams, and the first DCIs transmitted on different analog beams include different indication information for indicating the contention-based PUSCH resource corresponding to used analog beams.

The technical solutions provided in the embodiments of the present application have at least the following beneficial effects:

implementing of optimizing the PUSCH resource indication manner in preconfigured uplink transmission, thereby improving data transmission efficiency and reducing UE's power consumption.

Embodiment 2

The method for contention-based uplink data transmission in the Embodiment 1 of the present application will be described comprehensively and in detail through the following embodiments.

In the first aspect, there are following advantages of dynamically scheduling contention-based PUSCH resource.

In the embodiment of the present application, the PUSCH resource used for contention-based uplink data transmission are dynamically scheduled by the base station through DCI. Compared with the pre-configuration method using RRC signaling, the advantages of dynamically scheduling contention-based PUSCH resource through DCI is that the base station may dynamically schedule PUSCH resource used for contention-based uplink data transmission based on instantaneous load and the allocation of system resource, without statically configuring and reserving PUSCH resource used for contention-based uplink data transmission over a long period of time.

The base station may allocate contention-based PUSCH resource at a time, that is, transmit the corresponding DCI, or may not allocate contention-based PUSCH resource, that is, do not transmit the corresponding DCI, depending on the implementation of base station. Optionally, when the instantaneous load of the network is large and the system has no idle uplink physical resource, the base station may not configure PUSCH resource for contention-based uplink data transmission; when the instantaneous load of the network is small and the system has idle uplink physical resource, the base station may use these idle uplink physical resource for contention-based PUSCH transmission.

The UE does not need to continuously monitor the DCI indicating the contention-based PUSCH resource, and only monitors the DCI when data arrives. If no data arrives, the UE does not need to monitor the DCI. In addition, the system may predefine or preconfigure the TBS or maximum TBS of the PUSCH. When the amount of data arrived exceeds the TBS or maximum TBS of the PUSCH, the UE does not need to monitor the DCI and falls back to use other ways to transmit data. In addition, the system may specify conditions for contention-based PUSCH transmission. Optionally, a condition for the RRC idle mode UE or inactive mode UE to perform contention-based PUSCH transmission is that there is available a timing advance (TA). When the condition for contention-based PUSCH transmission is not met, the UE does not need to monitor the DCI and falls back to use other ways to transmit data.

In the second aspect, the contention resolution process for PUSCH transmission is as below.

In the embodiment of the present application, PUSCH resource are shared by multiple UEs, the multiple UEs may transmit PUSCHs on the same resource at the same time, and thus PUSCHs may collide. In order to ensure the reliability of PUSCH transmission, UEs need to perform the contention resolution process after transmitting PUSCHs, i.e., a contention-based PUSCH transmission. The system should pre-define or pre-configure a contention resolution window, and the UE monitors a contention resolution signaling in the contention resolution window. If the contention resolution UE ID detected by the UE is the same as the reported contention resolution UE ID, the contention is successful, that is, the data transmission is successful, and the UE will feed back an ACK; if the contention resolution UE ID detected by the UE is different from the reported contention resolution UE ID, or no contention resolution UE ID is detected, the contention is unsuccessful and the UE may attempt to monitor the next DCI dynamically indicating contention-based PUSCH resource, or fall back to use other ways to transmit data. Optionally, the data is transmitted through the RACH process or Early Data Transmission (EDT) process.

Similar to the RACH contention resolution process, the PUSCH contention resolution process is very similar to the two-step RACH process. The difference is that the MsgA here contains only the PUSCH and does not contain the preamble of PRACH. After transmitting the MsgA (PUSCH), the UE monitors the MsgB containing the solution signaling. Optionally, the MsgB is a PDCCH, that is, the contention resolution UE ID is carried by a physical layer signaling DCI; optionally, the MsgB is a PDSCH scheduled by the PDCCH, that is, the contention resolution UE ID is carried by a MAC layer signaling.

In addition, the MsgA (PUSCH) may also support the retransmission of HARQ, that is, the MsgB may also schedule the retransmission of MsgA (PUSCH). Optionally, the second DCI indicates to schedule the retransmission of MsgA (PUSCH); optionally, the second DCI schedules PDSCH, and the scheduled PDSCH indicates to schedule the retransmission of MsgA (PUSCH) through the MAC layer signaling. If the MsgB detected by the UE is to schedule a retransmission of the MsgA (PUSCH), the UE continues to monitor the MsgB after transmitting the retransmission of the PUSCH.

Optionally, the above-mentioned first DCI indicates a group of contention-based PUSCH resource. Correspondingly, the above-mentioned second DCI schedules a PDSCH, and the scheduled PDSCH carries a contention resolution UE ID through MAC layer signaling. Similar to the MAC RAR of the RACH contention resolution process, contention responses of a group of PUSCH resources may be multiplexed in the same MAC PDU of the PDSCH, the contention response of each PUSCH resource corresponds to a MAC subPDU. The system numbers each PUSCH resource according to a predefined rule, and the MAC subPDU corresponding to each PUSCH resource contains a subHeader, which is used to indicate the corresponding PUSCH resource number and the type of the MAC subPDU. One type of MAC subPDU is used for contention resolution, and at this time, the MAC subPDU includes at least one field indicating contention resolution ID (40 bits). The MAC subPDU may also include a field indicating PUCCH resource for feedback the ACK. Another type of MAC subPDU is used for PUSCH retransmission scheduling, and at this time, the MAC subPDU includes at least PDSCH retransmission scheduling information. Here, the first DCI and the second DCI should use different RNTIs, and may also use different DCI formats.

Optionally, the above-mentioned first DCI indicates at most one contention-based PUSCH resource. Correspondingly, the above-mentioned second DCI indicates the contention resolution UE ID, that is, the second DCI includes at least one field indicating the contention resolution UE ID (40 bits), and may also include a field indicating PUCCH resource for feedback ACK. Here, the first DCI and the second DCI should use the same RNTI and the same DCI format, and the DCI format includes a Flag field (1 bit) for determining whether the DCI includes PUSCH resource scheduling or contention response.

In the third aspect, the contention-based PUSCH transmission is used for RRC connected mode, idle mode and/or non-connected mode.

The contention-based PUSCH transmission may be applied to RRC connected mode UEs, such as RRC connected mode UEs that are not configured with Scheduling Request (SR) resource, or RRC connected mode UEs that are configured with SR resource but without available SR resource within the time delay of arrived data due to the long period of the SR resource; or the RRC connected mode UEs that are configured with the SR resource but does not receive a response from the base station after transmitting the SR, or the like. The above RRC connected mode UE may use contention-based PUSCH transmission, which has the advantages of reducing UE's power consumption, reducing transmission delay, and saving signaling overhead. For example, it may have the advantages: the UE does not need to transmit an SR requesting uplink resource to transmit data; the UE does not need to transmit data through the RACH process; if the UE monitors a contention-based PUSCH resource when the data arrives, it may directly transmit the data without waiting for later available SR resource, RACH resource, or pre-configured uplink resource, and so on.

The contention-based PUSCH transmission may also be applied to RRC non-connected mode UEs, including RRC idle mode UEs and RRC inactive mode UEs. Optionally, an RRC non-connected mode UE with a small data packet service characteristic may use the above-mentioned contention-based PUSCH transmission, which has the advantage of reducing UE's power consumption, reducing transmission delay, and saving signaling overhead. For example, it may have the advantages: the UE does not need to establish an RRC connection to transmit data through the RACH process; the UE does not need to transmit data through the EDT process; if the UE monitors a contention-based PUSCH resource when the data arrives, it may directly transmit the data without waiting for the later available RACH resource or pre-configured uplink resource.

The contention-based PUSCH transmission is an optional capability for the base station side and an optional capability for the UE side. Optionally, the base station configures the contention-based PUSCH transmission through the cell system broadcast information. The RRC connected mode UE and/or the RRC non-connected mode UE with contention-based PUSCH transmission capability residing in the cell may use the contention-based transmission by default, in other words, may monitor the above-mentioned first DCI and transmit data on the detected contention-based PUSCH resource.

Optionally, the base station configures contention-based PUSCH transmission through the cell system broadcast information, and only when the base station enables contention-based PUSCH transmission, for example, through UE-specific signaling, RRC connected mode UEs and/or RRC non-connected mode UEs with contention-based PUSCH transmission capabilities residing in the cell may monitor the abovementioned first DCI and transmit data on the detected contention-based PUSCH resource.

In a fourth aspect, the contention-based PUSCH resource are shared by all UEs or a group of UEs.

The uplink resource used for contention-based PUSCH transmission may be shared by all UEs with contention-based PUSCH transmission capability. The base station may only configure one first RNTI value, that is, all UEs configured with contention-based PUSCH transmission will monitor the first DCI scrambled with the first RNTI value. Optionally, the base station may only transmit at most one first DCI scrambled with the above-mentioned first RNTI value at a time. Optionally, the base station may transmit multiple first DCIs scrambled with the above-mentioned first RNTI value at a time, wherein each DCI indicates only one PUSCH resource. If the UE detects multiple first DCIs, the UE may randomly select one from the multiple first DCIs and use the indicated PUSCH resource to transmit data.

The uplink resource used for contention-based PUSCH transmission may also be shared by a group of UEs with contention-based PUSCH transmission capability. The base station will configure multiple first RNTI values. Each RNTI value corresponds to a group of UEs, and the UE only monitors the first DCI scrambled with the RNTI value corresponding the UE group. Optionally, the group ID to which the UE belongs is configured by the base station through a UE-specific RRC signaling. Optionally, the group ID to which the UE belongs is calculated implicitly by the UE according to the grouping rule, and optionally, the UE obtains the group ID according to the UE ID (such as TMSI).

Optionally, the contention-based PUSCH resource dynamically scheduled by the base station are shared by all RRC connected mode UEs, or shared by a group of RRC connected mode UEs.

Optionally, the contention-based PUSCH resource dynamically scheduled by the base station are shared by all RRC idle mode UEs or shared by a group of RRC idle mode UEs.

Optionally, the contention-based PUSCH resource dynamically scheduled by the base station are shared by all RRC inactive mode UEs, or shared by a group of RRC inactive mode UEs.

Optionally, the contention-based PUSCH resource dynamically scheduled by the base station are shared by all RRC non-connected mode UEs, or shared by a group of RRC non-connected mode UEs. Here, the RRC non-connected mode UEs include RRC idle mode UEs and RRC inactive mode UEs.

Optionally, the contention-based PUSCH resource dynamically scheduled by the base station are shared by all the UEs in the cell or shared by a group of UEs in the cell. Here, the UEs in the cell include UEs in all modes, that is, RRC connected mode UEs, RRC idle mode UEs and RRC inactive mode UEs.

Optionally, the contention-based PUSCH resource dynamically scheduled by the base station are shared by all DRX UEs or shared by a group of DRX UEs. Here, the DRX UE refers to an RRC idle mode UE configured with the DRX mode.

Optionally, the contention-based PUSCH resource dynamically scheduled by the base station are shared by all eDRX UEs or shared by a group of eDRX UEs. Here, the eDRX UE refers to an RRC idle mode UE configured in the eDRX mode.

In a fifth aspect, the first DCI indicates one or a group of contention-based PUSCH resource.

Optionally, the first DCI indicates only one PUSCH resource; optionally, the first DCI indicates one or more PUSCH resource; and optionally, the first DCI indicates multiple PUSCH resource. If the first DCI indicates multiple PUSCH resource, the UE randomly selects one from the multiple PUSCH resource for transmitting data. Herein, "one PUSCH resource" indicates that there is only one resource and only one DMRS no matter in the time domain, the frequency domain, and/or the code domain; "multiple PUSCH resource" indicates that there may be multiple resources or multiple DMRSs in the time domain, the frequency domain, the orthogonal code domain, and/or the non-orthogonal code domain.

Optionally, the first DCI indicates a group of PUSCH resources, which uses different time-frequency resource blocks, and the UE randomly selects one from the multiple time-frequency resource blocks for data transmission. Optionally, this group of PUSCH resources are multiplexed in a TDM and/or FDM manner.

Optionally, the first DCI indicates a group of PUSCH resources, which use the same time-frequency resource block but uses different orthogonal cover codes (OCCs), and the UE randomly selects one from multiple OCCs for data transmission. That is, this group of PUSCH resources are multiplexed on the same time-frequency resource block through OCC.

Optionally, the first DCI indicates a group of PUSCH resources, which use the same time-frequency resource block but uses different orthogonal spreading codes, and the UE randomly selects one from multiple orthogonal spreading codes for data transmission. That is, this group of PUSCH resources are multiplexed on the same time-frequency resource block through CDM.

Optionally, the first DCI indicates a group of PUSCH resources, which use the same time-frequency resource block but uses different DMRSs, and the UE randomly selects one from multiple DMRSs for data transmission. Optionally, this group of PUSCH resources use different DMRS ports, or use different cyclic offsets of the same DMRS sequence, or use DMRS sequences generated by different initialization seeds.

Optionally, the first DCI indicates a group of PUSCH resources, which use the same time-frequency resource block, but use different non-orthogonal codewords, and the UE randomly selects one from multiple non-orthogonal codewords for data transmission. Optionally, this group of PUSCH resources are multiplexed on the same time-frequency resource block through Non-orthogonal Multiple Access (NOMA) technology.

In the sixth aspect, high layer configuration information for contention-based PUSCH transmission.

In order to support contention-based PUSCH transmission, the UE should receive high layer configuration information of the contention-based PUSCH transmission. The high layer configuration information includes at least one of the following information.

1. A First Physical Downlink Control Channel Search Space for Transmitting a First DCI.

Optionally, it does not need to configure the first physical downlink control channel search space, but it reuses the existing physical downlink control channel search space of the first physical downlink control channel search space in the system. Optionally, it reuses the existing cell common search space of the system, such as a cell common search space for scheduling system information block (SIB), remaining minimum system information (RMSI), and random access response (RAR) or Paging Occasion (PO).

Optionally, the first physical downlink control channel search space reuse a part of the configuration parameters of the existing physical downlink control channel search space of system. Optionally, a part of the parameters of the first physical downlink control channel search space reuse the configuration of existing cell common search space of the system, such as the PDCCH aggregation level (AL) and/or the number of PDCCH blind detections, but another part of the parameters thereof need to be specifically configured, such as the monitoring period of the search space.

2. A Second Physical Downlink Control Channel Search Space for Transmitting a Second DCI.

Optionally, the second physical downlink control channel search space and the first physical downlink control channel search space are the same search space, that is, the first DCI for dynamically scheduling contention-based PUSCH resource and the second DCI for indicating a PUSCH contention response use the same search space. Optionally, the second physical downlink control channel search space and the first physical downlink control channel search space are different search spaces, that is, they are configured separately.

3. A First RNTI for Transmitting a First DCI.

If the contention-based PUSCH resource are shared by all UEs in the cell, the first RNTI value is cell specific value. If the contention-based PUSCH resource are shared by a group of UEs in the cell, the first RNTI value is UE-group specific value.

4. A Second RNTI for Transmitting a Second DCI.

Optionally, the second RNTI and the first RNTI are the same RNTI, that is, the first DCI for dynamically scheduling contention-based PUSCH resource and the second DCI for indicating a PUSCH contention response use the same RNTI. Optionally, the second RNTI and the first RNTI are different RNTIs, that is, they are configured separately.

5. A First CORESET for Transmitting a Second DCI.

Optionally, it does not need to configure the first CORESET, but it reuses the existing CORESET of the system. Optionally, it reuses the existing initial or cell common CORESET of the system, such as the CORESETs for scheduling RMSI, RAR, and PO.

Optionally, the first CORESET reuse a part of configuration parameters of the existing CORESET of system. For example, some parameters of the first CORESET reuse the existing configuration of the CORESET system, such as the location of the PDCCH time-frequency resource, but another part of the parameters thereof need to be specifically configured, such as the period of the CORESET.

6. A Second CORESET for Transmitting a Second DCI.

Optionally, the second CORESET and the first CORESET are the same CORESET, that is, the first DCI for dynamically scheduling contention-based PUSCH resource and the second DCI for indicating a PUSCH contention response use the same CORESET. Optionally, the second CORESET and the first CORESET are different CORESETs, that is, they are configured separately.

7. PUSCH Power Control Parameters.

The power control parameters should include at least the configuration of the nominal power P0, that is, at least the following two parameters: the system nominal power p0-NominalPUSCH, and the UE-specific offset p0-UE-PUSCH. Optionally, the power control parameters further include a configuration of the path loss compensation factor α.

8. DMRS Parameters of PUSCH.

The parameter configuration of the DMRS should include at least PUSCH group assignment information (groupAssignmentPUSCH) and cyclic shift information (cyclicShift). For a 5G NR system, DMRS mode configuration may also be included.

Optionally, the base station configures cyclic offset values for a group of DMRSs, and the UE randomly selects one from the cyclic offset values of the group of DMRS for transmitting a contention-based PUSCH.

Optionally, the parameter does not need to be configured, but reuse the DMRS configuration information contained in the PUSCH-ConfigCommon in the existing system.

Optionally, the parameter is optionally configured. If the parameter is not configured, the UE uses a default configuration, or reuses the DMRS configuration information contained in the PUSCH-ConfigCommon in the existing system by default.

9. A Contention Resolution Window of the PUSCH.

The contention-based PUSCH transmission requires a contention resolution. After transmitting the PUSCH, the UE should monitor the corresponding contention resolution signaling within a pre-configured time window (i.e., a contention resolution window) until the contention resolution process ends or the contention resolution window ends.

Optionally, the parameter does not need to be configured, but reuse the configuration information of the contention resolution window of the 2-Step RACH process in the cell system information.

Optionally, the contention resolution window is measured in absolute time. Optionally, the time window is in the unit of the period of the downlink physical control channel search space.

10. Maximum Number of PUSCH Retransmissions.

Optionally, this parameter does not need to be configured, but reuse the maximum number of retransmissions of the Msg3 broadcast and configured in the cell system information.

Optionally, the parameter is optionally configured. If the parameter is not configured, the UE uses a default value or the maximum number of retransmissions of the Msg3 broadcast and configured in the cell system information by default.

11. TBS or Maximum TBS of PUSCH.

The TBS or maximum TBS of the PUSCH may be pre-configured by the base station through high layer signaling.

Optionally, if the uplink data arrived at the UE side cannot be completely transmitted through the TBS or the maximum TBS of the contention-based PUSCH transmission, the UE does not need to monitor the first DCI for dynamically scheduling the contention-based PUSCH resource, and falls back to use other ways to transmit data.

Optionally, if the uplink data arrived at the UE side cannot be completely transmitted through the TBS or the maximum TBS of the contention-based PUSCH transmission, the UE still monitors the DCI for dynamically scheduling the contention-based PUSCH resource. If the contention-based PUSCH resource is detected, a part of the data is transmitted on the contention-based PUSCH resource, and the remaining data is transmitted by other ways.

Optionally, in addition to transmitting some data, the RRC non-connected mode UE also transmits an RRC connection request message of RRC layer to request the establishment of the RRC connection, and then receives the configuration message for the RRC connection establishment of the base station and enters the RRC connected mode to transmit the remaining data; or in addition to transmitting some data, the RRC idle mode UE also transmits a buffer status report (BSR) and/or SR of MAC layer to request additional uplink resource to transmit the remaining data, that is, the base station dynamically allocates contention-free PUSCH resource to the UE for transmitting the remaining data. The RRC connected mode UE transmits a BSR at the MAC layer to request additional uplink resource to transmit the remaining data, that is, the base station dynamically allocates contention-free PUSCH resource to the UE for transmitting the remaining data.

12. The First DL BWP for Transmitting a First DCI.

Optionally, the parameter does not need to be configured, but reuse of initial DL BWP of existing system.

Optionally, the parameter is optionally configured. If the parameter is not configured, the UE uses a default configuration, or reuses initial DL BWP of existing system by default.

13. A Second DL BWP for Transmitting a Second DCI.

Optionally, the first DL BWP and second DL BWP is the same DL BWP, i.e., the first DCI for dynamically scheduling contention-based PUSCH resource and the second DCI for indicating the PUSCH contention response belong to the same DL BWP. Optionally, the first DL BWP and second DL BWP are different, that is, they are configured separately.

14. UL BWP where PUSCH is.

Optionally, the parameter does not need to be configured, but reuse initial UL BWP of existing systems.

Optionally, the parameter is optionally configured. If the parameter is not configured, the UE uses a default configuration, or reuse the initial UL BWP of existing system by default.

For LTE MTC and LTE NB-IOT systems, the above configuration information does not include parameters 5, 6, 12, 13, and 14.

Optionally, the base station broadcasts the configuration information of the above-described contention-based uplink data transmission through the cell system information, i.e., the UE acquires the high layer configuration information of the contention-based uplink data transmission through SIB or RMSI.

Optionally, the base station indicates the configuration information of the above-described contention-based uplink data transmission through UE-specific RRC signaling. When the contention-based uplink data transmission is used for the RRC idle mode UE or RRC inactive mode UE, the UE in the RRC connected mode acquires all configuration information of contention-based uplink data transmission, and saves acquired configuration information to use in the RRC idle mode or a non-active mode.

Optionally, the base station indicates a part of the configuration information of the above-described contention-based uplink data transmission through SIB or RMSI, and indicates another part of the configuration information of the contention-based uplink data transmission through UE-specific RRC signaling.

In a seventh aspect, the contents included in the first DCI and the second DCI.

Optionally, the first DCI and the second DCI use the same RNTI, that is, the first and second DCIs are the same RNTI, and the first DCI and the second DCI use the same DCI format (or use the same DCI payload size). This DC format supporting both the first DCI and the second DCI functions includes a Flag field (1 bit), which is used to determine whether the DCI is used for PUSCH resource scheduling or contention response.

Optionally, when the indication value of the Flag field contained in the DCI is 0, it indicates that the DCI is used for PUSCH resource scheduling, specifically used for initial transmission scheduling or retransmission scheduling of the PUSCH. At this time, the DCI further includes at least one of the following information:

1. The index of the UL BWP.

If the high layer configuration information has a UL BWP indicating for contention-based PUSCH transmission, this field may be removed.

2. Frequency domain resource location of PUSCH.
3. Time domain resource location of PUSCH.
4. MCS or TBS for PUSCH.
5. Whether PUSCH frequency hopping is enabled.
6. The HARQ process number of the PUSCH.
7. Redundancy version (RV) for PUSCH.
8. Number of PUSCH repetitions.
9. New Data Indicator (NDI).
10. Uplink carrier type indication (UL or SUL).

That is, when the indication value of the Flag field included in the DCI is 0, the DCI indicates the initial transmission or retransmission of the PUSCH, and the parameter 9 (NDI) indicates whether the transmission is the initial transmission or the retransmission. That is, the DCI is the above-mentioned first DCI, when the NDI indicates the initial transmission of the PUSCH; the DCI is the above-mentioned second DCI, when the NDI indicates the retransmission of the PUSCH.

In an example, when the indication value of the Flag field included in the DCI is 1, it indicates that the DCI includes contention resolution signaling. At this time, the DCI further includes at least one of the following information:

1. Contention resolution UE ID (40 bits).
2. PUCCH resource for ACK feedback.

That is, when the indication value of the Flag field included in the DCI is 1, the DCI indicates the contention resolution UE ID, which is the above-mentioned second DCI.

In another example, when the indication value of the Flag field included in the DCI is 1, it indicates that the DCI schedules a PDSCH containing contention resolution signaling, and the PDSCH indicates contention resolution UE ID through MAC layer signaling, or indicates the retransmission of the PUSCH through MAC layer signaling. At this time, the DCI further includes at least one of the following information:

1. Index of the DL BWP.

If the high layer configuration information indicates the DL BWP where the PDSCH containing the contention response signaling is located, or the PDSCH and the PDCCH belong to the same DL BWP by default, this field may be removed.

2. Frequency domain resource location of PDSCH.
3. Time domain resource location of PDSCH.
4. MCS or TBS for PDSCH.
5. HARQ process number of PDSCH.
6. RV for PDSCH.
7. Number of PUSCH repetitions.
8. New Data Indicator (NDI).
9. VRB-PRB mapping method.

That is, when the indication value of the Flag field included in the DCI is 1, the DCI schedules a PDSCH indicating a contention resolution UE ID, which is the abovementioned second DCI. In the existing system, the format of the DCI for scheduling PUSCH and the format of the DCI for scheduling PDSCH use the same DCI payload size which are distinguished by one bit field. Then, the existing field for distinguishing PDSCH scheduling and PUSCH scheduling is the above-mentioned Flag field. When scheduling a PUSCH, the DCI is that indicates a contention-based PUSCH resource, and when scheduling a PDSCH, the DCI is that schedules a PDSCH containing contention resolution signaling.

Optionally, the first DCI and the second DCI use different RNTIs, that is, the first RNTI and the second RNTI are different RNTIs. The first DCI and the second DCI may use the same DCI format, or use different DCI formats. For the second DCI, when used to indicate contention-resolution UE ID or schedule PUSCH retransmission, the second DCI should include a Flag field to distinguish whether the second DCI indicates contention resolution UE ID or scheduling PUSCH retransmission.

Optionally, when the indication value of the Flag field included in the second DCI is 0, it indicates that the second DCI is used to indicate the contention resolution UE ID. At this time, the second DCI further includes at least one of the following information:
  1. Contention resolution UE ID (40 bits).
  2. PUCCH resource for ACK feedback.

When the indication value of the Flag field included in the second DCI is 1, it indicates that the second DCI is used to schedule PUSCH retransmission. At this time, the second DCI further includes at least one of the following information:
  1. The index of the UL BWP.
  If the high layer configuration information has a UL BWP indicating for contention-based PUSCH transmission, this field may be removed.
  2. Frequency domain resource location of PUSCH.
  3. Time domain resource location of PUSCH.
  4. MCS or TBS for PUSCH.
  5. Whether PUSCH frequency hopping is enabled.
  6. The HARQ process number of the PUSCH.
  7. RV of PUSCH.
  8. Number of PUSCH repetitions.
  9. New Data Indicator (NDI).
  10. Uplink carrier type indication (UL or SUL).

In an eighth aspect, the contention-based PUSCH transmission supports multiple TBS values for UE to select.

The contention-based PUSCH transmission may support multiple TBS values for the UE to select, and the UE may select the most appropriate TBS value according to the amount of data arrived. The base station configures multiple TBS values for contention-based PUSCH transmission. The UE selects a suitable TBS value based on the amount of data actually arrived. The criteria for selecting a suitable TBS value is that the PUSCH may carry all the data and MAC PDUs have the least padding bits.

Optionally, the base station configures multiple TBS values for the contention-based PUSCH transmission, and allocates multiple symbols or time slots in the time domain for the contention-based PUSCH transmission. The PUSCH transmission corresponding to the maximum TBS value should use all symbols or time slots allocated in the time domain, and PUSCH transmissions corresponding to other TBS values shall use some symbols or time slots allocated in the time domain, and the transmission shall start from the first symbol or time slot allocated in the time domain. In one example, the contention-based PUSCH transmission is transmitted in a repeated manner on multiple symbols or time slots allocated in the time domain, that is, each TBS value corresponds to a different number of repetitions, and a large TBS value uses a larger number of repetitions. A small TBS value uses a small number of repetitions. The first DCI may indicate the number of repetitions corresponding to the maximum TBS value or the minimum TBS value. The number of repetitions corresponding to other TBS values may be calculated based on the indicated maximum TBS value or the minimum TBS value. In another example, the contention-based PUSCH transmission is transmitted in a rate-matched manner on multiple symbols or time slots allocated in the time domain, that is, all resource in multiple symbols or time slots are used for the rate matching of PUSCH transmission, and the data encoded by the PUSCH is mapped to multiple symbols or time slots. TBS values correspond to different number of symbols or time slots for the rate matching of PUSCH transmission respectively. A larger TBS value uses more symbols or time slots for the rate matching of PUSCH transmission. A small TBS value uses fewer symbols or time slots for the rate matching of PUSCH transmission. The first DCI may indicate the number of symbols or time slots corresponding to the maximum TBS value or the minimum TBS value, and the number of symbols or time slots corresponding to other TBS values may be calculated according to the number of symbols or time slots corresponding to the indicated maximum TBS value or minimum TBS value.

Optionally, the base station blindly decodes the contention-based PUSCH transmission based on the assumption of multiple TBSs. Optionally, the UE informs the base station of the TBS information actually used for the contention-based PUSCH transmission, and optionally, it is carried in a piggyback manner through the PUSCH (that is, the TBS information is mapped on a part of REs of the PUSCH in a predefined manner after coding and modulation, wherein the PUSCH performs rate matching processing on these REs), or it is carried in a punctured manner through a part of REs of PUSCH (that is, the TBS information is mapped on a part of REs of PUSCH in a predefined manner after coding and modulation, wherein the PUSCH performs punching processing on these REs), or it is carried by the PUSCH transmission block (for example, adding 1 to 2 bits at the end of the PUSCH transmission block to carry TBS information), or it is carried by different DMRS sequences, or it is carried by different CRC masks.

The ninth aspect, conditions for contention-based PUSCH transmission.

For RRC non-connected mode UEs (including RRC idle mode UEs and RRC inactive mode UEs), a necessary condition for using contention-based PUSCH transmission is that there must be available TAs. The RRC non-connected mode UE may save the latest TA value obtained in the RRC connected mode or EDT process as the initial TA value. When using contention-based PUSCH transmission, the TA verification criterion should be used to determine whether the saved TA value is still valid.

Applicable TA validation criteria may include at least one of the following criteria:
  1. Determining whether the TA is valid according to whether the RRC non-connected mode TimeAlignmentTimer has expired. If the TimeAlignmentTimer expires, the TA is invalid. If the TimeAlignmentTimer is still running, the TA is valid.
  2. Determining whether the TA is valid according to whether the serving cell (i.e., the UE's reside cell) has changed. If the serving cell changes, the TA is invalid. If the serving cell has not changed, the TA is valid.
  3. Determining whether the TA is valid according to the RSRP change of the serving cell. If the RSRP change exceeds a pre-defined or pre-configured threshold, the TA is invalid; otherwise, the TA is valid.
  4. Determining whether the TA is valid according to the change of the RSRP of one or more neighboring cells. If the change of the RSRP exceeds a predefined or preconfigured threshold, the TA is invalid; otherwise, the TA is valid.

5. Determining whether the TA is valid according to changes in the time difference of arrival (TDOA) of at least two base stations' signals. If the change of the TDOA exceeds a predefined or pre-configured threshold, the TA is invalid, otherwise, the TA is valid.
6. Determining whether the TA is valid according to the UE's static label. If the UE has a label indicating static characteristics, the TA is valid; otherwise, the TA is invalid.
7. Determining whether the TA is valid according to the radius of the serving cell. If the cell system information indicates that the cell radius is less than a predefined or pre-configured threshold, the TA is valid; otherwise, the TA is invalid.

If determining that the TA is valid according to the above TA determination criteria, the UE may use contention-based PUSCH transmission, that is, monitor the first DCI and transmit data on the detected contention-based PUSCH resource; if determining that the TA is invalid, the UE may fall back to use other ways to transmit data, such as transmitting data through the RACH or EDT process, or updating the TA through the contention-free RACH process, that is, the UE is pre-configured with a dedicated PRACH preamble for updating the TA, and the UE uses the contention-based PUSCH transmission after obtaining a new TA.

The tenth aspect: fallback mechanism for contention-based PUSCH transmission.

Under certain specific conditions, a contention-based PUSCH transmission may be unavailable. The UE needs to fall back to use other ways to transmit data. The possible fallback conditions are at least one of the followings:
1. If the amount of data arrived exceeds the TBS value of the PUSCH indicated by the first DCI or the amount of data arrived exceeds the maximum TBS value of the PUSCH indicated by the first DCI (the first DCI indicates multiple TBS values for UE selection), the UE should fall back to use other ways to transmit data.
2. If the UE is unsuccessful in performing one or more consecutive PUSCH transmissions, the UE should fall back to use other ways to transmit data.
3. During the UE performing a contention-based PUSCH transmission, the base station may instruct the UE to fall back to use other ways to transmit data through the second DCI. If the UE may fall back to multiple ways to transmit data, the base station may instruct the UE to fall back to which way to transmit data through the second DCI.
4. If the RRC non-connected mode UE does not have an available TA, the UE should fall back to use other ways to transmit data.
5. If the UE does not monitor the resource for the contention-based PUSCH transmission within a predefined or pre-configured time, the UE should fall back to use other ways to transmit data. Due to the latency requirements of data transmission, the UE cannot always monitor the PUSCH resource after the data arrives. If no PUSCH resource is detected after attempting for a period of time, the UE should fall back to use other ways to transmit data.

For an RRC non-connected mode UE, the UE should fall back to the RACH process to transmit data, or fall back to the EDT process to transmit data, or fall back to preconfigured uplink resource to transmit data. The fallback to RACH process means that the UE initiates a contention-based random access process to transmit data after establishing an RRC connection with the base station; the fallback to EDT means that the UE initiates an Early Data Transmission (EDT) process to transmit data through Msg3. The premise of using EDT is that the amount of data arrived may be transmitted through the maximum TBS allowed by EDT.

For RRC connected mode UEs, the UE should fall back to transmit data through the Msg3 of the RACH process or to transmit data through the RACH process to request uplink resource, or fall back to transmit data through the SR to request uplink resource, or fall back to transmit data on pre-configured uplink resource.

In the eleventh aspect, contention-based PUSCH transmission is applied to FR2.

In a 5G NR system, for a high-frequency carrier, such as a carrier frequency range (Frequency Range 2, FR2) higher than 6 GHz, in order to improve the received signal power, the signal transmission needs to be based on an analog beam, and the signal transmitted based on the analog beam may only be received by the UE in the specified direction. If a signal needs to be received by all UEs in the cell, the signal should be transmitted based on Beam Sweeping, that is, it is transmitted on each analog beam in turn, wherein the signal is only transmitted based on an analog beam at a time.

The above-mentioned contention-based PUSCH transmission may also be applied to FR2. If the contention-based PUSCH resource are shared by all UEs in the cell, or shared by a group of UEs of which the optimal downlink beams may be the same or different, the above first DCI should be transmitted in Beam Sweeping mode, that is, the base station transmits the first DCI on different analog beams in a time-division manner. As shown in FIG. 3, the first DCI is transmitted on eight analog beams in turns, and the first DCI on each analog beam has corresponding contention-based PUSCH resource. The UE only needs to monitor the first DCI corresponding to the optimal downlink transmission beam and transmit data on the indicated or corresponding contention-based PUSCH resource. In other words, the UE implicitly informs the base station of the optimal analog beam of the UE through selected PUSCH resource, and the base station may transmit a contention-based response (i.e., the second DCI) on the corresponding optimal analog beam.

Optionally, the first DCIs on different analog beams in FIG. 3 include the same indication information, that is, the first DCI #1~#8 include the same indication information, all indicating a group of time-division multiplexed PUSCH resource, that is, PUSCH resource #1~#8. In other words, the indication information of PUSCH resource #1~#8 may be obtained according to any one of the first DCIs. In order to save signaling overhead, PUSCH resource #1~#8 have an implicit relationship. Optionally, PUSCH resource #1~#8 are the same in frequency domain and are completely continuous in the time domain. Assuming that the maximum number of beams used for sweeping is eight, the base station always transmits the first DCI on all the eight analog beams, and schedules eight PUSCH resource to correspond to eight analog beams respectively, that is, the contention-based PUSCH resource are allocated for UEs in all directions.

Here, the first DCI is transmitted in a predefined sequence of analog beams, and the time domain location where the first DCI is located corresponds to the index of the analog beam. The base station either transmits the first DCI on all the analog beams, or not transmits the first DCI on each analog beam. Since each analog beam has a corresponding PUSCH resource, the UE should determine the PUSCH resource to be used according to the index of the optimal downlink analog beam. For example, if the index of the optimal downlink analog beam of the UE is #3, the data is transmitted on PUSCH resource #3.

Optionally, the first DCIs on different analog beams in FIG. 3 include different indication information, that is, the first DCI #1~#8 include different indication information, and each first DCI independently schedules corresponding PUSCH resource. Optionally, the first DCI #1 only indicates the PUSCH resource #1, and so on. In addition, there is no implicit relationship between PUSCH resource #1~#8. For example, PUSCH resource #1~#8 may have different frequency domain positions, and discontinuous time domain positions. Assuming that the maximum number of beams for sweeping is eight, the base station can transmit the first DCI only on a specific analog beam according to the actual available resource. As shown in FIG. 3, the base station may transmit the first DCI only on the analog beams #3 and #5, and only schedules PUSCH resource #3 and #5 for contention-based PUSCH transmission, that is, contention-based PUSCH resource are only allocated to UEs in some specific directions.

Here, the first DCI is transmitted in a predefined sequence of analog beams. The time domain location where the first DCI is located corresponds to the index of the analog beam. The base station may either transmit the first DCI on all analog beams, or not transmit the first DCI on each analog beam. Since not every analog beam has a corresponding PUSCH resource, the UE transmits data only on the PUSCH resource scheduled by the detected first DCI, which has nothing to do with the index of the optimal downlink analog beam of the UE. If the UE monitors the first DCI in multiple analog beams, the UE may select one of the multiple PUSCH resource scheduled by the first DCI for data transmission. The specific selection of the UE may depend on the implementation of the UE. For example, the UE selects the PUSCH resource corresponding to the analog beam of which the reference signal with the strongest receiving energy to be used for data transmission, or the UE randomly selects one PUSCH resource for data transmission.

Optionally, the set of analog beams used to transmit the first DCI corresponds to all synchronization signal and PBCH blocks (SSBs). For example, if the total number of SSBs is sixteen (i.e., corresponding to sixteen analog beams), the set of beams used to transmit the first DCI is also sixteen. Similar to the initial CORESET used to schedule the remaining minimum system information (RMSI), and a transmission configuration indicator (TCI) for transmitting a CORESET of the first DCI also has a one-to-one correspondence with the SSB.

Optionally, the set of analog beams used to transmit the first DCI corresponds to a set of SSBs. Optionally, the total number of SSBs is sixteen (i.e., corresponding to sixteen analog beams), the number of beam sets used to transmit the first DCI may be four, specifically which four beam sets are indicated by the TCI for transmitting the CORESET of the first DCI.

Optionally, if the contention-based PUSCH resource are shared by a group of UEs in the cell, and the optimal downlink beams of this group of UEs are completely the same, the above-mentioned first DCI is transmitted only on a specific analog beam, that is, the first DCI is similar to normal UE-specific DCI and does not need to perform beam sweeping.

All the implementation schemes proposed in the embodiments of the present application may be evolved into other schemes after being simply extended. Optionally, in addition to indicating the PUSCH resource, the first DCI also indicates the PRACH resource and/or the preamble. The PUSCH resource and the PRACH resource and/or the preamble indicated by the first DCI are shared by multiple UEs.

In other words, the UE transmits data through a contention-based two-step RACH process, which differs from the conventional two-step RACH process in that the PRACH resource and/or the preamble and the PUSCH resource is dynamically allocated through the first DCI.

The technical solutions provided in the embodiments of the present application have at least the following beneficial effects:

The optimization of the PUSCH resource indication manner for the pre-configured uplink transmission is realized, which improves the data transmission efficiency and reduces the UE's power consumption.

Embodiment 3

Based on the same inventive concepts of the first and second embodiments, an embodiment of the present application further provides a UE. The structure of the UE is shown in FIG. 4. The UE 40 includes a first processing module 401, a second processing module 402, and a third processing modules 403.

A first processing module 401 is configured to receive high layer configuration information for a contention-based physical uplink shared channel (PUSCH) transmission.

A second processing module 402 is configured to monitor first downlink control information (DCI) scrambled with a first radio network temporary identity (RNTI) in a first physical downlink control channel search space based on the high layer configuration information, and determining contention-based PUSCH resource according to the detected first DCI.

A third processing module 403 is configured to transmit data on the contention-based PUSCH resource.

A third processing module 403 is specifically used to transmit data on the contention-based PUSCH resource, and reporting a first contention resolution UE identity (ID); monitor a second DCI scrambled with a second RNTI in a second physical downlink control channel search space based on the high layer configuration information, wherein the second DCI indicates the second contention resolution UE ID or schedules a retransmission of the PUSCH; or the second DCI schedules a physical downlink shared channel (PDSCH), wherein the PDSCH indicates the second contention resolution UE ID or schedules a retransmission of the PUSCH through media access control (MAC) layer signaling; and transmit the retransmission of PUSCH, when a resource for retransmission of the PUSCH is detected; or transmit an acknowledgement (ACK) when the second contention resolution UE ID is detected and it is the same as the first contention resolution UE ID, wherein the ACK is used to indicate that the UE contention is successful.

Optionally, the high layer configuration information comprises at least one of the followings: the first physical downlink control channel search space for transmitting the first DCI, the second physical downlink control channel search space for transmitting the second DCI, the first RNTI for transmitting the first DCI, the second RNTI for transmitting the second DCI, a first control resource set (CORESET) for transmitting the first DCI, a second CORESET for transmitting the second DCI, power control parameters of the PUSCH, demodulation reference signal (DMRS) parameters of the PUSCH, a contention resolution window of the PUSCH, maximum times of retransmission of PUSCH, a transmission block size (TBS) or a maximum TBS of PUSCH, a first downlink bandwidth part (DL BWP) for transmitting the first DCI, and a second DL BWP for transmitting the second DCI, and the uplink bandwidth part (UL BWP) where the PUSCH is located.

Optionally, the first RNTI and the second RNTI are the same RNTI, the first DCI and the second DCI use the same DCI format, or use the same DCI payload size, wherein the first DCI and the second DCI include a Flag field, which is used to determine whether the DCI is used for PUSCH resource scheduling or PUSCH contention response.

Optionally, the first DCI indicates a group of contention-based PUSCH resource, which comprises at least one of the followings:
- the first DCI indicating that a group of PUSCH resources use different time-frequency resource blocks, and the UE randomly selects one from a plurality of time-frequency resource blocks for data transmission;
- the first DCI indicating that a group of PUSCH resources use the same time-frequency resource block and different orthogonal coverage codes (OCCs), and the UE randomly selects one from a plurality of OCCs for data transmission;
- the first DCI indicating that a group of PUSCH resources use the same time-frequency resource block and different orthogonal spreading codes, and the UE randomly selects one from a plurality of orthogonal spreading codes for data transmission;
- the first DCI indicating that a group of PUSCH resources use the same time-frequency resource block and different DMRSs, and the UE randomly selects one from a plurality of DMRSs for data transmission; and
- the first DCI indicating that a group of PUSCH resources use the same time-frequency resource block and use different non-orthogonal codewords and the UE randomly selects one from a plurality of non-orthogonal codewords for data transmission.

Optionally, the contention-based PUSCH resource are shared by all or a group of UE 40 supporting contention-based PUSCH transmission, wherein the contention-based PUSCH resource are shared by all or a group of UEs supporting contention-based PUSCH transmission comprising at least one of the followings:
- the contention-based PUSCH resource dynamically scheduled by a base station are shared by all radio resource control (RRC) connected mode UEs supporting contention-based PUSCH transmission, or shared by a group of RRC connected mode UEs supporting contention-based PUSCH transmission;
- the contention-based PUSCH resource dynamically scheduled by the base station are shared by all RRC idle mode UEs supporting contention-based PUSCH transmission, or shared by a group of RRC idle mode UEs supporting contention-based PUSCH transmission;
- the contention-based PUSCH resource dynamically scheduled by the base station are shared by all RRC inactive mode UEs supporting contention-based PUSCH transmission, or shared by a group of RRC inactive mode UEs supporting contention-based PUSCH transmission;
- the contention-based PUSCH resource dynamically scheduled by the base station are shared by all RRC non-connected mode UEs supporting contention-based PUSCH transmission, or shared by a group of RRC non-connected mode UEs supporting contention-based PUSCH transmission, wherein the RRC non-connected mode UEs include a RRC idle mode UE and a RRC inactive mode UE;
- the contention-based PUSCH resource dynamically scheduled by the base station are shared by all the UEs in the cell supporting contention-based PUSCH transmission, or shared by a group of the UEs in the cell supporting contention-based PUSCH transmission, wherein the UE includes the RRC connected mode UE and the RRC idle mode UE and RRC inactive mode UE;
- the contention-based PUSCH resource dynamically scheduled by the base station are shared by all discontinuous reception (DRX) mode UEs supporting contention-based PUSCH transmission, or shared by a group of DRX mode UEs supporting contention-based PUSCH transmission, wherein the DRX mode UEs include a RRC idle mode UE and RRC inactive mode UE which are configured with the DRX mode;
- the contention-based PUSCH resource dynamically scheduled by the base station are shared by all extended discontinuous reception (eDRX) mode UEs supporting contention-based PUSCH transmission, or are shared by a group of eDRX mode UEs supporting contention-based PUSCH transmission, wherein the eDRX mode UEs include a RRC idle mode UE and RRC inactive mode UE which are configured to be in the eDRX mode.

Optionally, the UE 40 determines that the contention-based PUSCH transmission is used when TA is valid, according to a Timing Advance (TA) determination criterion, if the UE 40 is in an RRC idle mode or an RRC inactive mode.

Optionally, the TA determination criterion comprise at least one of the followings: determining whether the TA is valid according to whether the TA in the RRC idle mode or the RRC inactive mode expires, wherein the TA is invalid if the TA expires and the TA is valid if the TA is still running;
determining whether the TA is valid according to whether the serving cell has changed, wherein the TA is invalid if the serving cell has changed and the TA is valid if the serving cell has not changed;
determining whether the TA is valid according to the change of the reference signal reception power (RSRP) of the serving cell, wherein the TA is invalid if the change of the RSRP of the serving cell exceeds a predefined or pre-configured threshold, otherwise, the TA is valid;
determining whether the TA is valid according to the change of the RSRP of one or more neighboring cells, wherein the TA is invalid if the change of the RSRP of one or more neighboring cells exceeds a predefined or pre-configured threshold, otherwise, the TA is valid;
determining whether the TA is valid according to the change in a time difference of arrival (TDOA) of at least two base stations' signals, wherein the TA is invalid if the change in TDOA exceeds a predefined or pre-configured threshold, otherwise, the TA is valid;
determining whether the TA is valid according to a UE's static label, wherein the TA is valid if the UE has a label indicating static characteristics, otherwise, the TA is invalid; and
determining whether the TA is valid according to a radius of the serving cell, wherein the TA is valid if cell system information indicates that the radius of the cell is less than a predefined or pre-configured threshold, otherwise, the TA is invalid.

Optionally, when the UE 40 is in the RRC idle mode or the RRC inactive mode, according to a fallback condition, the UE 40 falls back to use at least one of the following ways to transmit data: transmitting data through a contention-based random access process, transmitting data through an advanced data transmission process, and transmitting data on pre-configured uplink resource.

When the UE 40 is in the RRC connected mode, according to the fallback condition, the UE 40 falls back to use at least one of the following ways to transmit data: transmitting data through a contention-based random access process, transmitting data through a contention-based random access process to request uplink resource, transmitting data through an uplink scheduling request (SR) to request uplink resource and transmitting data on pre-configured uplink resource.

Optionally, the fallback conditions comprise at least one of the followings:

the amount of data arrived at the UE side exceeds the TBS value of the PUSCH, or the amount of data arrived at the UE side exceeds the maximum TBS value of the PUSCH;

the UE is failed after performing one or more consecutive PUSCH transmissions;

the second DCI indicates the fallback of UE;

the UE is in the RRC idle mode or the RRC inactive mode, and the UE has no available TA; and the UE does not monitor the contention-based PUSCH resource within a predefined or pre-configured time.

Optionally, the configuration information of multiple TBS values of the contention-based PUSCH is received, wherein the PUSCH transmission corresponding to the largest TBS value among the multiple TBS values uses all symbols or time slots allocated in time domain, and PUSCH transmissions corresponding to the other TBS values among the multiple TBS values use a part of symbols or time slots allocated in the time domain, and transmission starts from the first symbol or time slot in the time domain; and UE selects a TBS value that causes the MAC layer to add the least number of bits to transmit the contention-based PUSCH according to the amount of data arrived.

Optionally, the transmitting the contention-based PUSCH comprises at least one of the followings:

transmitting contention-based PUSCH in a repeated manner on multiple symbols or time slots allocated in the time domain; and transmitting contention-based PUSCH in a rate-matched manner on multiple symbols or time slots allocated in the time domain.

The technical solutions provided in the embodiments of the present application have at least the following beneficial effects:

The optimization of the PUSCH resource indication manner for the pre-configured uplink transmission is realized, which improves the data transmission efficiency and reduces the UE's power consumption.

For the content that is not described in detail in the UE provided in the embodiment of the present application, reference may be made to the above-mentioned contention-based uplink data transmission method. The beneficial effects achieved by the UE provided in this embodiment of the present application are the same as the abovementioned contention-based uplink data transmission method, and will not repeated herein.

Embodiment 4

Based on the same inventive concepts as the first and second embodiments, the embodiment of the present application further provides a base station. The schematic structure diagram of the base station is shown in FIG. 5. The base station 50 includes a fourth processing module 501, a fifth processing module 502, a sixth processing module 503, a seventh processing module 504, and an eighth processing module 505.

A fourth processing module 501 is configured to transmit high layer configuration information for contention-based PUSCH transmission for contention-based uplink data transmission.

A fifth processing module 502 is configured to transmit a first downlink control information (DCI) scrambled with a first radio network temporary identity (RNTI) in a first physical downlink control channel search space, wherein the first DCI includes indication information of a contention-based PUSCH resource.

A sixth processing module 503 is configured to receive a data transmission on PUSCH resource indicated by the DCI, wherein the data transmission also carries a contention resolution UE ID.

A seventh processing module 504 is configured to transmit a second DCI scrambled with a second RNTI, wherein the second DCI indicates the contention resolution UE ID or schedules a retransmission of PUSCH; or the second DCI schedules one PDSCH, which indicates the contention resolution UE ID or schedules a retransmission of PUSCH through media access control (MAC) layer signaling.

An eighth processing module 505 is configured to receive a retransmission of the PUSCH; or receive an ACK, which is used to indicate a successful contention solution of the PUSCH.

Optionally, the base station 50 configures multiple TBS values for contention-based PUSCH transmission; and the base station 50 blindly decodes contention-based PUSCH transmission based on the assumption of multiple TBS values.

Optionally, the base station 50 transmits the first DCI on different analog beams in a time division manner, and the contention-based PUSCH resource indicated by the first DCI has a one-to-one correspondence with the used analog beam.

Optionally, the base station 50 transmit the first DCI on different analog beams in a time division manner includes at least one of the followings:

transmitting the first DCIs on all analog beams, and the first DCIs transmitted on different analog beams include the same indication information for indicating the contention-based PUSCH resource corresponding to all the analog beams; and transmitting the first DCIs on a part of the analog beams, and the first DCIs transmitted on different analog beams include different indication information for indicating the contention-based PUSCH resource corresponding to used analog beams.

The technical solutions provided in the embodiments of the present application have at least the following beneficial effects:

The optimization of the PUSCH resource indication manner for the pre-configured uplink transmission is realized, which improves the data transmission efficiency and reduces the UE's power consumption.

For the content that is not described in detail in the base station provided in the embodiment of the present application, reference may be made to the above-mentioned contention-based uplink data transmission method. The beneficial effects achieved by the base station provided in this embodiment of the present application are the same as the above-mentioned contention-based uplink data transmission method, and will not repeated herein.

Embodiment 5

Based on the same inventive concepts of Embodiments 1 & 2, the embodiment of the present application further provides a user equipment. The schematic structural diagram of the user equipment is shown in FIG. 6. The user equipment 600 includes at least one processor 601, a memory 602 and a bus 603. The at least one processor 601 is electrically connected to the memory 602; the memory 602 is configured to store at least one computer-executable instruction, and the processor 601 is configured to execute the at least one computer-executable instruction, so as to execute steps of any contention-based uplink data transmission method provided by any embodiment or any alternative implementation in Embodiments 1 & 2 of the present application.

Further, the processor 601 may be a Field-Programmable Gate Array (FPGA) or other devices having logic processing capabilities, such as an Microcontroller Unit (MCU), and a Central Processing Unit (CPU).

The technical solutions provided in the embodiments of the present application have at least the following beneficial effects:

the optimization of the PUSCH resource indication manner for the pre-configured uplink transmission is realized, which improves the data transmission efficiency and reduces the UE's power consumption.

Embodiment 6

Based on the same inventive concepts of Embodiments 1 & 2, the embodiment of the present application further provides a base station. The schematic structural diagram of the base station is shown in FIG. 7. The base station 700 includes at least one processor 701, a memory 702 and a bus 703. The at least one processor 701 is electrically connected to the memory 702; the memory 702 is configured to store at least one computer-executable instruction, and the processor 701 is configured to execute the at least one computer-executable instruction, so as to execute steps of any contention-based uplink data transmission method provided by any embodiment or any alternative implementation in Embodiments 1 & 2 of the present application.

Further, the processor 701 may be a Field-Programmable Gate Array (FPGA) or other devices having logic processing capabilities, such as an Microcontroller Unit (MCU), and a Central Processing Unit (CPU).

The technical solutions provided in the embodiments of the present application have at least the following beneficial effects:

the optimization of the PUSCH resource indication manner for the pre-configured uplink transmission is realized, which improves the data transmission efficiency and reduces the UE's power consumption.

Embodiment 7

Based on the same inventive concepts of Embodiments 1 & 2, the embodiment of the present application further provides a computer readable storage medium which stores a computer program that, when executed by a processor, is used to execute steps of any contention-based uplink data transmission method provided by any embodiment or any alternative implementation in Embodiments 1 & 2 of the present application.

The computer readable storage media provided by embodiments of the present application include, but are not limited to, disks of any type (including floppy disks, hard disks, optical disks, CD-ROMs, and magnetic optical disks), Read-Only Memory (ROM), Random Access Memory (RAM), Erasable Programmable Read-Only Memory (EPROM), Erasable Programmable Read-Only Memory (EPROM), Electrically Erasable Programmable Read-Only Memory (EEPROM), flash memory, magnetic cards or light cards. That is, a readable storage medium includes any medium in which information is stored or transmitted in a readable form by a device (for example, a computer).

The technical solutions provided in the embodiments of the present application have at least the following beneficial effects:

the optimization of the PUSCH resource indication manner for the pre-configured uplink transmission is realized, which improves the data transmission efficiency and reduces the UE's power consumption.

It should be appreciated by the person skilled in the art that each block as well as the combination of the blocks in the structural block graphs and/or block graphs and/or flowcharts may be implemented through computer program instructions. It should be appreciated by the person skilled in the art that these computer program instructions may be provided to general-purpose computer, dedicated computer or other processors capable of programming the data processing methods, to generate machines, so as to implement the methods specified in the block(s) of the structural block graphs and/or block graphs and/or flowcharts through the instructions executed on the computer or other processors capable of programming the data processing methods.

It should be appreciated by the person skilled in the art that the various operations, methods, steps in the flow, measures and schemes discussed in the present application can be alternated, modified, combined or deleted. Furthermore, other operations, methods, steps in the flow, measures and schemes involving the various operations, methods, steps in the flow, measures and schemes discussed in the present application may also be alternated, modified, rearranged, dissolved, combined or deleted. Furthermore, other operations, methods, steps in the flow, measures and schemes having the same functions with the various operations, methods, steps in the flow, measures and schemes discussed in the present application may also be alternated, modified, rearranged, dissolved, combined or deleted.

The above description is only part of the embodiments of the present application. It should be noted that, for those of ordinary skill in the art, without departing from the principles of the present application, several improvements and retouches can be made. These improvements and retouches also should be regarded as the protection scope of the present application.

The invention claimed is:

1. A method performed by a user equipment (UE) for contention-based uplink data transmission, the method comprising:
receiving, from a base station, high layer configuration information for a contention-based physical uplink shared channel (PUSCH) transmission;
monitoring a first downlink control information (DCI) scrambled with a first radio network temporary identity (RNTI) in a first physical downlink control channel search space based on the high layer configuration information;
determining a contention-based PUSCH resource based on the detected first DCI;
transmitting data and a first contention resolution UE identity (ID) on the contention-based PUSCH resource;
monitoring a second DCI scrambled with a second RNTI in a second physical downlink control channel search space based on the higher layer configuration information, wherein the second DCI indicates the second contention resolution UE ID or schedules a retransmission of the PUSCH;

transmitting, to the base station, the retransmission of the PUSCH in case that the second DCI schedules a retransmission of the PUSCH; and transmitting, to the base station, an acknowledgement (ACK) to indicate successful contention resolution of the PUSCH in case that the second contention resolution UE ID is same as the first contention resolution UE ID;

receiving configuration information of multiple transmission block size (TBS) values of the contention-based PUSCH, wherein the PUSCH transmission corresponding to a largest TBS value among the multiple TBS values uses all symbols or time slots allocated in time domain of the contention-based PUSCH resource, and PUSCH transmissions corresponding to the other TBS values among the multiple TBS values use a part of symbols or time slots allocated in the time domain, and transmission starts from the first symbol or time slot allocated in the time domain; and selecting a TBS value that causes the MAC layer to add a least amount of bits to transmit the contention-based PUSCH based on the amount of data arrived.

2. The method of claim 1, wherein the high layer configuration information comprises at least one of the following:

the first physical downlink control channel search space for transmitting the first DCI, the second physical downlink control channel search space for transmitting the second DCI, the first RNTI for transmitting the first DCI, the second RNTI for transmitting the second DCI, a first control resource set (CORESET) for transmitting the first DCI, a second CORESET for transmitting the second DCI, power control parameters of the PUSCH, demodulation reference signal (DMRS) parameters of the PUSCH, a contention resolution window of the PUSCH, maximum times of retransmission of PUSCH, a TBS or a maximum TBS of the PUSCH, a first downlink bandwidth part (DL BWP) for transmitting the first DCI, a second DL BWP for transmitting the second DCI, or the uplink bandwidth part (UL BWP) where the PUSCH is located.

3. The method of claim 1, wherein the first RNTI and the second RNTI are the same RNTI, wherein the first DCI and the second DCI use the same DCI format, or use the same DCI payload size, and wherein the first DCI and the second DCI comprise a Flag field, which is used to determine whether the DCI is used for PUSCH resource scheduling or PUSCH contention response.

4. The method of claim 1, wherein the first DCI indicates a group of contention-based PUSCH resources, which comprises at least one of the following:

the first DCI indicating that a group of PUSCH resources use different time-frequency resource blocks, and the UE randomly selects one from a plurality of time-frequency resource blocks for data transmission;

the first DCI indicating that a group of PUSCH resources use the same time-frequency resource block and different orthogonal coverage codes (OCCs), and the UE randomly selects one from a plurality of OCCs for data transmission;

the first DCI indicating that a group of PUSCH resources use the same time-frequency resource block and different orthogonal spreading codes, and the UE randomly selects one from a plurality of orthogonal spreading codes for data transmission;

the first DCI indicating that a group of PUSCH resources use the same time-frequency resource block and different DMRSs, and the UE randomly selects one from a plurality of DMRSs for data transmission; or the first DCI indicating that a group of PUSCH resources use the same time-frequency resource block and use different non-orthogonal codewords and the UE randomly selects one from a plurality of non-orthogonal codewords for data transmission.

5. The method of claim 1, wherein the contention-based PUSCH resource is shared by all or a group of UEs supporting contention-based PUSCH transmission, wherein the contention-based PUSCH resource is shared by all or a group of UEs supporting contention-based PUSCH transmission comprising at least one of the following:

the contention-based PUSCH resource dynamically scheduled by a base station is shared by all radio resource control (RRC) connected mode UEs supporting contention-based PUSCH transmission, or shared by a group of RRC connected mode UEs supporting contention-based PUSCH transmission;

the contention-based PUSCH resource dynamically scheduled by the base station is shared by all RRC idle mode UEs supporting contention-based PUSCH transmission, or shared by a group of RRC idle mode UEs supporting contention-based PUSCH transmission;

the contention-based PUSCH resource dynamically scheduled by the base station is shared by all RRC inactive mode UEs supporting contention-based PUSCH transmission, or shared by a group of RRC inactive mode UEs supporting contention-based PUSCH transmission;

the contention-based PUSCH resource dynamically scheduled by the base station is shared by all RRC non-connected mode UEs supporting contention-based PUSCH transmission, or shared by a group of RRC non-connected mode UEs supporting contention-based PUSCH transmission, wherein the RRC non-connected mode UEs include a RRC idle mode UE and a RRC inactive mode UE;

the contention-based PUSCH resource dynamically scheduled by the base station is shared by all the UEs in the cell supporting contention-based PUSCH transmission, or shared by a group of the UEs in the cell supporting contention-based PUSCH transmission, wherein the UE includes the RRC connected mode UE and the RRC idle mode UE and RRC inactive mode UE;

the contention-based PUSCH resource dynamically scheduled by the base station is shared by all discontinuous reception (DRX) mode UEs supporting contention-based PUSCH transmission, or shared by a group of DRX mode UEs supporting contention-based PUSCH transmission, wherein the DRX mode UEs include RRC idle mode UE and RRC inactive mode UE which are configured with the DRX mode; or the contention-based PUSCH resource dynamically scheduled by the base station is shared by all extended discontinuous reception (eDRX) mode UEs supporting contention-based PUSCH transmission or are shared by a group of eDRX mode UEs supporting contention-based PUSCH transmission, wherein the eDRX mode UEs include RRC idle mode UE and RRC inactive mode UE which are configured to be in the eDRX mode.

6. The method of claim 1, further comprising:
determining that the contention-based PUSCH transmission is used when a timing advance (TA) is valid, by the UE based on a TA determination criterion, when the UE is in a radio resource control (RRC) idle mode or an RRC inactive mode,
wherein the TA determination criterion comprises at least one of the following:
  determining whether the TA is valid based on whether the TA in the RRC idle mode or the RRC inactive mode expires, wherein the TA is invalid if the TA expires and the TA is valid if the TA is still running;
  determining whether the TA is valid based on whether a serving cell has changed, wherein the TA is invalid if the serving cell has changed and the TA is valid if the serving cell has not changed;
  determining whether the TA is valid based on the change of a reference signal reception power (RSRP) of the serving cell, wherein the TA is invalid if the change of the RSRP of the serving cell exceeds a predefined or pre-configured threshold, otherwise, the TA is valid;
  determining whether the TA is valid based on the change of the RSRP of one or more neighboring cells, wherein the TA is invalid if the change of the RSRP of one or more neighboring cells exceeds a predefined or pre-configured threshold, otherwise, the TA is valid;
  determining whether the TA is valid based on the change in a time difference of arrival (TDOA) of at least two base stations' signals, wherein the TA is invalid if the change in TDOA exceeds a predefined or pre-configured threshold, otherwise, the TA is valid;
  determining whether the TA is valid based on a UE's static label, wherein the TA is valid if the UE has a label indicating static characteristics, otherwise, the TA is invalid; or
  determining whether the TA is valid based on a radius of the serving cell, and
wherein the TA is valid if cell system information indicates that the radius of the cell is less than a predefined or pre-configured threshold, otherwise, the TA is invalid.

7. The method according to claim 1, further comprising:
in case that the UE is in a radio resource control (RRC) idle mode or an RRC inactive mode, based on a fallback condition, the UE falling back to use at least one of the following ways to transmit data:
transmitting data through a contention-based random access process, transmitting data through an advanced data transmission process, or transmitting data on pre-configured uplink resource,
wherein the fallback conditions comprise at least one of the following:
the amount of uplink data arrived at the UE side exceeds the TBS value of the PUSCH, or the amount of data arrived exceeds the maximum TBS value of the PUSCH;
the UE is failed after performing one or more consecutive PUSCH transmissions;
the second DCI indicates the fallback of UE;
the UE is in the RRC idle mode or the RRC inactive mode, and the UE has no available TA; or
the UE does not monitor the contention-based PUSCH resource within a predefined or pre-configured time.

8. The method of claim 1,
wherein transmitting the contention-based PUSCH comprises at least one of the followings:
transmitting contention-based PUSCH in a repeated manner on multiple symbols or time slots allocated in the time domain; and
transmitting contention-based PUSCH in a rate-matched manner on multiple symbols or time slots allocated in the time domain.

9. A method for contention-based uplink data transmission, applied to a base station, the method comprising:
transmitting high layer configuration information for a contention-based physical uplink shared channel (PUSCH) transmission for a contention-based uplink data transmission;
transmitting a first downlink control information (DCI) scrambled with a first radio network temporary identity (RNTI) in a first physical downlink control channel search space, wherein the first DCI includes indication information of a contention-based PUSCH resource;
receiving a PUSCH transmission on an uplink contention-based resource indicated by the first DCI, wherein the PUSCH transmission also carries a contention resolution user equipment identity (UE ID);
transmitting a second DCI scrambled with a second RNTI in a second physical downlink control channel search space, wherein the second DCI indicates the contention resolution UE ID or schedules a retransmission of PUSCH;
receiving a retransmission of the PUSCH; or receiving an ACK, which is used to indicate that the contention resolution of the PUSCH is successful;
configuring, by the base station, multiple transmission block size (TBS) values for the contention-based PUSCH transmission; and
blindly decoding the contention-based PUSCH transmission based on the configured multiple TBS values.

10. The method of claim 9, further comprising:
transmitting, by the base station, the first DCI on different analog beams in a time division manner, wherein the contention-based PUSCH resource indicated by the first DCI has a one-to-one correspondence with the used analog beams;
transmitting, by the base station, the first DCI on different analog beams in a time division manner includes at least one of the following:
transmitting the first DCIs on all analog beams, and the first DCIs transmitted on different analog beams include the same indication information for indicating the contention-based PUSCH resource corresponding to all the analog beams; and
transmitting the first DCIs on a part of the analog beams, and the first DCIs transmitted on different analog beams include different indication information for indicating the contention-based PUSCH resource corresponding to the different analog beams.

11. A user equipment (UE), comprising:
a first processing module configured to receive, from a base station, high layer configuration information for a contention-based physical uplink shared channel (PUSCH) transmission;
a second processing module configured to monitor first downlink control information (DCI) scrambled with a first radio network temporary identity (RNTI) in a first physical downlink control channel search space based on the high layer configuration information, and determining a contention-based PUSCH resource based on the detected first DCI; and
a third processing module configured to:
  transmit data and a first connection resolution UE identity (ID) on the contention-based PUSCH resource,
  monitor a second DCI scrambled with a second RNTI in a second physical downlink control channel search space based on the higher layer configuration information, wherein the second DCI indicates the second contention resolution UE ID or schedules a retransmission of the PUSCH,
  transmit, to the base station, the retransmission of the PUSCH in case that the second DCI schedules a retransmission of the PUSCH,
  transmit, to the base station, an acknowledgement (ACK) to indicate successful contention resolution of the PUSCH in case that the second contention resolution UE ID is same as the first contention resolution UE ID,
  receive configuration information of multiple transmission block size (TBS) values of the contention-based PUSCH, wherein the PUSCH transmission corresponding to a largest TBS value among the multiple TBS values uses all symbols or time slots allocated in time domain of the contention-based PUSCH resource, and PUSCH transmissions corresponding to the other TBS values among the multiple TBS values use a part of symbols or time slots allocated in the time domain, and transmission starts from the first symbol or time slot allocated in the time domain, and
  select a TBS value that causes the MAC layer to add a least amount of bits to transmit the contention-based PUSCH based on the amount of data arrived.

12. A base station, comprising:
a first processing module configured to transmit high layer configuration information for a contention-based physical uplink shared channel (PUSCH) transmission for a contention-based uplink data transmission;
a second processing module configured to transmit a first downlink control information (DCI) scrambled with a first radio network temporary identity (RNTI) in a first physical downlink control channel search space, wherein the first DCI includes indication information of a contention-based PUSCH resource;
a third processing module configured to receive a data transmission on PUSCH resource indicated by the DCI, wherein the data transmission also carries a contention resolution user equipment identity (UE ID);
a fourth processing module configured to transmit a second DCI scrambled with a second RNTI, wherein the second DCI indicates the contention resolution UE ID or schedules a retransmission of PUSCH; and
a fifth processing module configured to receive a retransmission of the PUSCH or receive an ACK, which is used to indicate that the contention resolution of the PUSCH is successful;
a sixth processing module configured to configure multiple transmission block size (TBS) values for the contention-based PUSCH transmission; and
a seventh processing module configured to blindly decode the contention-based PUSCH transmission based on the configured multiple TBS values.

13. A computer readable storage medium, which stores a computer program that, when executed by a processor, cause the processor to implement a user equipment (UE) method for contention-based uplink data transmission, the UE method comprising:
receiving, from a base station, high layer configuration information for a contention-based physical uplink shared channel (PUSCH) transmission;
monitoring a first downlink control information (DCI) scrambled with a first radio network temporary identity (RNTI) in a first physical downlink control channel search space based on the high layer configuration information;
determining a contention-based PUSCH resource based on the detected first DCI;
transmitting data and a first contention resolution UE identity (ID) on the contention-based PUSCH resource;
monitoring a second DCI scrambled with a second RNTI in a second physical downlink control channel search space based on the higher layer configuration information, wherein the second DCI indicates the second contention resolution UE ID or schedules a retransmission of the PUSCH;
transmitting, to the base station, the retransmission of the PUSCH in case that the second DCI schedules a retransmission of the PUSCH;
transmitting, to the base station, an acknowledgement (ACK) to indicate successful contention resolution of the PUSCH in case that the second contention resolution UE ID is same as the first contention resolution UE ID:
receiving configuration information of multiple transmission block size (TBS) values of the contention-based PUSCH, wherein the PUSCH transmission corresponding to a largest TBS value among the multiple TBS values uses all symbols or time slots allocated in time domain of the contention-based PUSCH resource, and PUSCH transmissions corresponding to the other TBS values among the multiple TBS values use a part of symbols or time slots allocated in the time domain, and transmission starts from the first symbol or time slot allocated in the time domain; and
selecting a TBS value that causes the MAC layer to add a least amount of bits to transmit the contention-based PUSCH based on the amount of data arrived.

* * * * *